(12) United States Patent
Shroff et al.

(10) Patent No.: US 11,004,031 B2
(45) Date of Patent: May 11, 2021

(54) DETERMINING ESTIMATED PICK-UP/DELIVERY WINDOWS USING CLUSTERING

(71) Applicant: United Parcel Service of America, Inc., Atlanta, GA (US)

(72) Inventors: Sumeet Pradeep Shroff, Chamblee, GA (US); Issac Azar, Atlanta, GA (US); Rosalie Piccione, Atlanta, GA (US); Ed Hojecki, Atlanta, GA (US); Brian Gerhard, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 228 days.

(21) Appl. No.: 15/347,881

(22) Filed: Nov. 10, 2016

(65) Prior Publication Data

US 2017/0262799 A1 Sep. 14, 2017

Related U.S. Application Data

(63) Continuation of application No. 15/335,828, filed on Oct. 27, 2016, now abandoned.
(Continued)

(51) Int. Cl.
*G06Q 10/08* (2012.01)
*G06Q 10/00* (2012.01)
(Continued)

(52) U.S. Cl.
CPC ......... *G06Q 10/0838* (2013.01); *G06N 7/005* (2013.01); *G06Q 10/00* (2013.01); *G06Q 10/0833* (2013.01); *G06Q 50/28* (2013.01)

(58) Field of Classification Search
CPC ............... G06Q 10/00; G06Q 10/0838; G06Q 10/0833; G06Q 50/28; G06N 7/005
(Continued)

(56) References Cited

U.S. PATENT DOCUMENTS 8,311,850 B2 11/2012 Johnson et al.
8,407,154 B1 3/2013 Fallows
(Continued)

FOREIGN PATENT DOCUMENTS

CN 110555448 * 5/2018 ........... G06K 9/6223
WO 2014/203256 A1 12/2014

OTHER PUBLICATIONS

Nandi. Manojit. "Density Based Clustering". https://blog.dominodatalab.com/topology-and-density-based-clustering/ (Year: 2015).*
(Continued)

*Primary Examiner* — George Chen
*Assistant Examiner* — Lisa Ma
(74) *Attorney, Agent, or Firm* — Shook, Hardy & Bacon L.L.P.

(57) ABSTRACT

Embodiments of the present invention provide methods, systems, apparatuses, and computer program products for determining delivery or pick-up windows. In one embodiment a method is provided comprising determining whether sufficient historical information/data to determine an estimated pick-up/delivery time is received for each weekday when deliveries are made and in response to determining that the sufficient historical information/data is available for a first weekday, determining an estimated pick-up/delivery time for the first serviceable point and for the first weekday based on the sufficient historical information/data for the first serviceable point and for the first weekday. Similarly, in response to determining that the sufficient historical information/data is not available for a second weekday, determining an estimated pick-up/delivery time for the first serviceable point and for the second weekday based on the first historical information/data.

15 Claims, 12 Drawing Sheets

Related U.S. Application Data

(60) Provisional application No. 62/307,641, filed on Mar. 14, 2016.

(51) Int. Cl.
   *G06Q 50/28* (2012.01)
   *G06N 7/00* (2006.01)

(58) Field of Classification Search
   USPC .................................................. 705/337
   See application file for complete search history.

(56) References Cited

U.S. PATENT DOCUMENTS

| | | | |
|---|---|---|---|
| 8,433,659 B2 | 4/2013 | Johnston et al. | |
| 8,924,312 B2 | 12/2014 | Kadaba | |
| 2003/0195699 A1* | 10/2003 | Jones | G06Q 10/08 701/522 |
| 2006/0224398 A1* | 10/2006 | Lakshman | G06Q 10/0833 705/333 |
| 2006/0235739 A1* | 10/2006 | Levis | G06Q 10/08 705/1.1 |
| 2007/0282900 A1* | 12/2007 | Owens | G06Q 10/063 |
| 2010/0312593 A1* | 12/2010 | Johnston | G06Q 40/02 705/7.34 |
| 2010/0312715 A1 | 12/2010 | Esque et al. | |
| 2013/0179205 A1 | 7/2013 | Slinin | |
| 2013/0218463 A1 | 8/2013 | Howard et al. | |
| 2014/0122155 A1 | 5/2014 | Smith | |
| 2014/0188748 A1 | 7/2014 | Cavoue et al. | |
| 2014/0330741 A1* | 11/2014 | Bialynicka-Birula | G06Q 10/0838 705/341 |
| 2015/0262433 A1 | 9/2015 | Davidson | |
| 2015/0363843 A1 | 12/2015 | Loppatto | |
| 2016/0042319 A1* | 2/2016 | Mauch | G06Q 10/0838 705/341 |
| 2016/0048804 A1* | 2/2016 | Paul | G06O 10/08355 705/338 |
| 2019/0043102 A1* | 2/2019 | Hariharan | G06Q 10/083 |
| 2019/0236522 A1* | 8/2019 | Steves | G05D 1/0212 |

OTHER PUBLICATIONS

ISA/220—Notification of Transmittal or Search Report and Written Opinion of the ISA, or the Declaration dated May 4, 2017 for WO Application No. PCT/US17/021720.

Non Final Office Action received for U.S. Appl. No. 15/335,799, dated Sep. 17, 2018, 18 pages.

Non-Final Office Action received for U.S. Appl. No. 15/335,828, dated Jun. 26, 2019, 28 pages.

\* cited by examiner

Delivery Times by Day and Route for 52 Weeks
Smith at 123 Main Street

| Route | Mondays | Tuesdays | Wednesdays | Thursdays | Fridays |
|---|---|---|---|---|---|
| Route 10A | 11:45 AM | 2:00 PM | 12:50 PM | 4:30 PM | 2:15 PM |
| Route 10A | - | 2:05 PM | 1:30 PM | 3:50 PM | 2:45 PM |
| Route 10A | - | - | - | 4:25 PM | - |
| Route 11C | - | 1:15 PM | 2:05 PM | 2:15 PM | - |
| Route 11C | - | - | - | 2:50 PM | - |
| Route 13B | - | - | - | 3:20 PM | - |

FIG. 5A

Average Delivery Times by Day and Route
Smith at 123 Main Street

| Route | Mondays | Tuesdays | Wednesdays | Thursdays | Fridays | Average All Days (Rollup) |
|---|---|---|---|---|---|---|
| Route 10A Average | - | 2:02 PM | 1:10 PM | 4:15 PM | 2:30 PM | 2:23 PM |
| Route 11C Average | - | - | - | 2:32 PM | - | 2:06 PM |
| Route 13B Average | - | - | - | - | - | - |
| Average for All Routes/ Days | - | 1:46 PM | 1:28 PM | 3:31 PM | 2:30 PM | 2:22 PM |

FIG. 5B

Estimated Delivery Windows by Day and Route
Smith at 123 Main Street

| Route | Mondays | Tuesdays | Wednesdays | Thursdays | Fridays | EDWs for All Days (Rollup) |
|---|---|---|---|---|---|---|
| Route 10A EDWs | - | 12:00-4:00 PM | 11:15 AM-3:15 PM | 2:15-6:15 PM | 12:30-4:30 PM | 12:30-4:30 PM |
| Route 11C EDWs | - | - | - | 12:30-4:30 PM | - | 12:00-4:00 PM |
| Route 13B EDWs | - | - | - | - | - | - |
| EDWs for All Routes/ Days | - | 11:45 AM-3:45 PM | 11:30 AM-3:30 PM | 1:30-5:30 PM | 12:30-4:30 PM | 12:30-4:30 PM |

FIG. 5C

| Address Clustering Level | Super-Urban | | Urban | | Suburban | | Rural | |
|---|---|---|---|---|---|---|---|---|
| | Time | Distance | Time | Distance | Time | Distance | Time | Distance |
| Exact (Primary) | 20s | 10m | 20s | 10m | 20s | 10m | 20s | 10m |
| Car Stop (proximity) | 30s | 25m | 30s | 50m | 60s | 100m | 60s | 400m |
| Street Level (proximity) | 55s | 300m | 55s | 600m | 90s | 300m | 90s | 600m |

| Main Street Cluster Parameters | | |
|---|---|---|
| | Max Distance | Max Time |
| Exact | 10 meters | 20 seconds |
| Car Stop | 40 meters | 60 seconds |
| Street Level | 60 meters | 100 seconds |

Clusters for 123 Main Street:
A – Exact
123 and 123 Main St: 5 meters / 10 seconds B – Car Stop
123 and 125 Main St: 27 meters / 36 seconds Not allowed:
123 and 126 Main St: 90 meters / 100 seconds

Delivery Times by Day and Route

Smith at 123 Main Street

| Route | Mondays | Tuesdays | Wednesdays | Thursdays | Fridays |
|---|---|---|---|---|---|
| Route 10A | 11:45 AM | 2:00 PM | 12:50 PM | 4:30 PM | 2:15 PM |
| Route 10A | - | 2:05 PM | 1:30 PM | 3:50 PM | 2:45 PM |
| Route 10A | - | - | - | 4:25 PM | - |
| Route 11C | - | 1:15 PM | 2:05 PM | 2:15 PM | - |
| Route 11C | - | - | - | 2:50 PM | - |
| Route 13 B | - | - | - | 3:20 PM | - |

Campbell at 125 Main Street

| Route | Mondays | Tuesdays | Wednesdays | Thursdays | Fridays |
|---|---|---|---|---|---|
| Route 10A | 12:15 PM | 2:00 PM | - | 3:45 PM | 1:30 PM |
| Route 10A | - | 1:50 PM | - | 4:15 PM | - |
| Route 11C | - | - | 12:50 PM | - | - |

FIG. 9A

Average Delivery Time by Day and Route for Service Point Cluster

Smith at 123 Main Street

| Route | Mondays | Tuesdays | Wednesdays | Thursdays | Fridays | EDWs All Days (Rollup) |
|---|---|---|---|---|---|---|
| Route 10A EDWs | 12:00pm | 2:00pm | 1:15pm | 4:15pm | 2:15pm | 2:15pm |
| Route 11C EDWs | - | - | 1:30pm | 2:30pm | - | 1:45pm |
| Route 13B EDWs | - | - | - | - | - | - |
| EDWs for All Routes/Days | - | 1:45pm | 1:30pm | 3:30pm | 2:30pm | 2:30pm |

FIG. 9B

| All Stops by Route and Day for 52 Weeks |||||
|---|---|---|---|---|
| Smith- 123 Main Street |||||
| Thursdays | 10A (2:45) | 10B (12:15) | 10C (3:30) | 10D (10:15) |

FIG. 11A

|  | Time (as decimal) |  | Time Difference from Average |  | Squared Difference from Average |
|---|---|---|---|---|---|
| 10A | 14.75 | 10A | 1.56 | 10A | 2.44 |
| 10B | 12.25 | 10B | -0.94 | 10B | 0.88 |
| 10C | 15.5 | 10C | 2.31 | 10C | 5.35 |
| 10D | 10.25 | 10D | -2.94 | 10D | 8.63 |

Average: 13.188

17.23    4  Sample Size

Sum of above: 17.23      Std. Deviation: 2.40
Variance: 5.77           Z Value: 1.20
                         Confidence Factor: 76

FIG. 11B

4 Hr. Estimated Delivery Windows by Day and Route
Smith at 123 Main Street

| Route | Mondays | Tuesdays | Wednesdays | Thursdays | Fridays | EDWs All Days (Rollup) |
|---|---|---|---|---|---|---|
| Route 10A EDWs | 10:00 AM-2:00 PM | 12:00-4:00 PM | 11:15 AM-3:15 PM | 2:15-6:15 PM | 12:15-4:15 PM | 12:15-4:15 PM |
| Route 11C EDWs | - | - | 11:30 AM-3:30 PM | 12:30-4:30 PM | - | 11:45 AM-3:45 PM |
| Route 13B EDWs | - | - | - | - | - | - |
| EDWs for All Routes/ Days | - | 11:45 AM-3:45 PM | 11:30 AM-3:30 PM | 1:30-5:30 PM | 12:30-4:30 PM | 12:30-4:30 PM |

FIG. 12A

3 Hr. Estimated Delivery Windows by Day and Route
Smith at 123 Main Street

| Route | Mondays | Tuesdays | Wednesdays | Thursdays | Fridays | EDWs All Days (Rollup) |
|---|---|---|---|---|---|---|
| Route 10A EDWs | 10:30 AM-1:30 PM | 12:30-3:30 PM | 11:45 AM-2:45 PM | 2:45-5:45 PM | 12:45-3:45 PM | 12:45-3:45 PM |
| Route 11C EDWs | - | - | 12:00 PM-3:00 PM | 1:00-4:00 PM | - | 12:15 - 3:15 PM |
| Route 13B EDWs | - | - | - | - | - | - |
| EDWs for All Routes/ Days | - | 12:15 - 3:15 PM | 12:00 PM-3:00 PM | 2:00 - 5:00 PM | 1:00-4:00 PM | 1:00-4:00 PM |

FIG. 12B

2 Hr. Estimated Delivery Windows by Day and Route
Smith at 123 Main Street

| Route | Mondays | Tuesdays | Wednesdays | Thursdays | Fridays | EDWs All Days (Rollup) |
|---|---|---|---|---|---|---|
| Route 10A EDWs | 11:00 AM-1:00 PM | 1:00-3:00 PM | 12:15 AM-2:15 PM | 3:15-5:15 PM | 1:15-3:15 PM | 1:15-3:15 PM |
| Route 11C EDWs | - | - | 12:30 AM-2:30 PM | 1:30-3:30 PM | - | 12:45 AM-2:45 PM |
| Route 13B EDWs | - | - | - | - | - | - |
| EDWs for All Routes/ Days | - | 12:45 AM-2:45 PM | 12:30 AM-2:30 PM | 2:30-4:30 PM | 1:30-3:30 PM | 1:30-3:30 PM |

FIG. 12C

1 Hr. Estimated Delivery Windows by Day and Route
Smith at 123 Main Street

| Route | Mondays | Tuesdays | Wednesdays | Thursdays | Fridays | EDWs All Days (Rollup) |
|---|---|---|---|---|---|---|
| Route 10A EDWs | 11:30 AM-12:30 PM | 1:30-2:30 PM | 12:45 - 1:45 PM | 3:45-4:45 PM | 1:45-2:45 PM | 1:45 - 2:45 PM |
| Route 11C EDWs | - | - | 1:00 - 2:00 PM | 2:00 - 3:00 PM | - | 1:15 - 2:15 PM |
| Route 13B EDWs | - | - | - | - | - | - |
| EDWs for All Routes/ Days | - | 1:15 - 2:15 PM | 1:00 – 2:00 PM | 3:00 – 4:00 PM | 2:00 – 3:00 PM | 2:00 – 3:00 PM |

FIG. 12D

DETERMINING ESTIMATED PICK-UP/DELIVERY WINDOWS USING CLUSTERING

CROSS-REFERENCE TO RELATED APPLICATIONS

This application is a continuation of U.S. application Ser. No. 15/335,828 filed Oct. 27, 2016, which claims priority to U.S. Provisional Application No. 62/307,641 filed Mar. 14, 2016, which is hereby incorporated herein in its entirety by reference.

BACKGROUND

Carriers often handle millions of pick-ups and deliveries on daily basis. Carriers typically arrange delivery of items or mail between a consignor/shipper and a consignee/recipient. The carrier is typically responsible for delivering items in a timely manner. As part of their services, carriers may provide customers (consignors/shippers and/or consignees/recipients) with an estimated window for picking up or delivering one or more items. Customers may rely on the estimated window for organizing various personal and business aspects. For example, merchant customers may rely on the estimated window to prepare equipment or personnel staffing based on the expected inventory at a particular time. Similarly, for items that require a recipient signature, customers may rely on the estimated delivery window to ensure that a person is present at a delivery location at a time of delivery. Accordingly, there is a dire need in the market for ways to provide highly accurate estimated windows for pick-ups and/or deliveries. Although the estimated windows are described in the transportation and logistics context, embodiments described herein have wide applicability outside of this context.

BRIEF SUMMARY

In general, one innovative aspect of the subject matter described herein can be embodied in methods that include the actions/events of identifying a cluster of serviceable points, the cluster (a) comprising a first serviceable point and a second serviceable point and (b) indicating that the first serviceable point and the second serviceable point are within one or more configurable thresholds of one another; determining whether historical data for the first serviceable point and the second serviceable point is sufficient to determine an estimated delivery time for the first serviceable point; in response to determining that the historical data for the first serviceable point and the second serviceable point is sufficient, determining the estimated delivery time for the first serviceable point based at least in part on the historical data; determining a confidence score for the estimated delivery time for the first serviceable point, the confidence score indicating the likelihood that the estimated delivery time is accurate; and determining an estimated delivery window for the first serviceable point based at least in part on the estimated delivery time and the confidence score, wherein the length of the estimated delivery window is based on the confidence score.

Other embodiments of this aspect include corresponding systems, apparatus, and computer programs, configured to perform the actions/events of the methods, encoded on a computer storage devices.

These and other embodiments can each optionally include one or more of the following features. Determining whether the confidence score satisfies a configurable confidence threshold. In response to determining that the confidence score satisfies the configurable confidence threshold, providing the estimated delivery window to a user associated with the first serviceable point. Determining that the confidence score is further based on an estimated delivery time variance determined from the historical data.

Other embodiments of this aspect include corresponding systems, apparatus, and computer programs, configured to perform the actions/events of the methods, encoded on computer storage devices.

These and other embodiments can each may optionally include one or more of the following features. Determining whether the estimated delivery window is within a specified period; and responsive to determining that the estimated delivery window is within the specified period, automatically modifying the length of the estimated delivery window.

In general, one innovative aspect of the subject matter described herein can be embodied in methods that include the actions/events of identifying a first serviceable point and a second serviceable point; determining whether a distance from the first serviceable point to the second serviceable point satisfies a configurable distance threshold; determining whether a travel time from the first serviceable point to the second serviceable point satisfies a configurable travel time threshold; in response to determining (a) that the distance from the first serviceable point to the second serviceable point satisfies the configurable distance threshold and (b) that the travel time from the first serviceable point to the second serviceable point satisfies the configurable travel time threshold, storing the first serviceable point and the second serviceable point in association with one another as a cluster.

These and other embodiments can each may optionally include one or more of the following features. Identifying a third serviceable point; determining whether a distance from the first serviceable point to the third serviceable point satisfies the configurable distance threshold; determining whether a travel time from the first serviceable point to the third serviceable point satisfies the configurable travel time threshold; and in response to determining (a) that the distance from the first serviceable point to the third serviceable point satisfies the configurable distance threshold and (b) that the travel time from the first serviceable point to the third serviceable point satisfies the configurable travel time threshold, storing the first serviceable point, the second serviceable point, and the third serviceable point in association with one another.

These and other embodiments can each may optionally include one or more of the following features. Identifying a geocode for the first serviceable point; and identifying, based at least in part on the geocode, the configurable distance threshold and the configurable travel time threshold. Receiving first historical data for first serviceable point, the first historical data comprising a plurality of dates and times of deliveries that occurred at the first serviceable point; receiving second historical data for second serviceable point, the second historical data comprising a plurality of dates and times of deliveries that occurred at the second serviceable point; and determining an estimated delivery time for the first serviceable point based at least in part on the first historical data and the second historical data.

These and other embodiments can each may optionally include one or more of the following features. Determining a confidence score for the estimated delivery time for the first serviceable point, the confidence score indicating the likelihood that the estimated delivery time is accurate; and determining an estimated delivery window for the first serviceable point based at least in part on the estimated delivery time and the confidence score, wherein the length of the estimated delivery window is based on the confidence score.

In general, one innovative aspect of the subject matter described herein can be embodied in methods that include the actions/events of identifying a cluster of serviceable points, the cluster (a) comprising a first serviceable point and a second serviceable point and (b) indicating that the first serviceable point and the second serviceable point are within one or more configurable thresholds of one another; receiving first historical data for first serviceable point, the first historical data comprising a plurality of dates and times of deliveries that occurred at the first serviceable point; receiving second historical data for second serviceable point, the second historical data comprising a plurality of dates and times of deliveries that occurred at the second serviceable point; and determining an estimated delivery time for the first serviceable point based at least in part on the first historical data and the second historical data.

These and other embodiments can each may optionally include one or more of the following features. Determining a confidence score for the estimated delivery time for the first serviceable point, the confidence score indicating the likelihood that the estimated delivery time is accurate. Determining an estimated delivery window for the first serviceable point based at least in part on the estimated delivery time and the confidence score, wherein the length of the estimated delivery window is based on the confidence score.

Particular embodiments of the subject matter described herein can be implemented so as to realize one or more of the following advantages. Allow carriers to provide highly accurate estimated pick-up/delivery windows. The customized estimated pick-up/delivery windows, in turn, enhances the user experience. In turn, the enhanced user experience can yield higher revenues and generate additional business. The pick-up/delivery windows may be used to optimize various business aspects for the carrier and customers.

The details of one or more embodiments of the subject matter described herein are set forth in the accompanying drawings and the description below. Other features, aspects, and advantages of the subject matter will become apparent from the description, the drawings, and the claims.

BRIEF DESCRIPTION OF THE DRAWINGS

Figure 1:
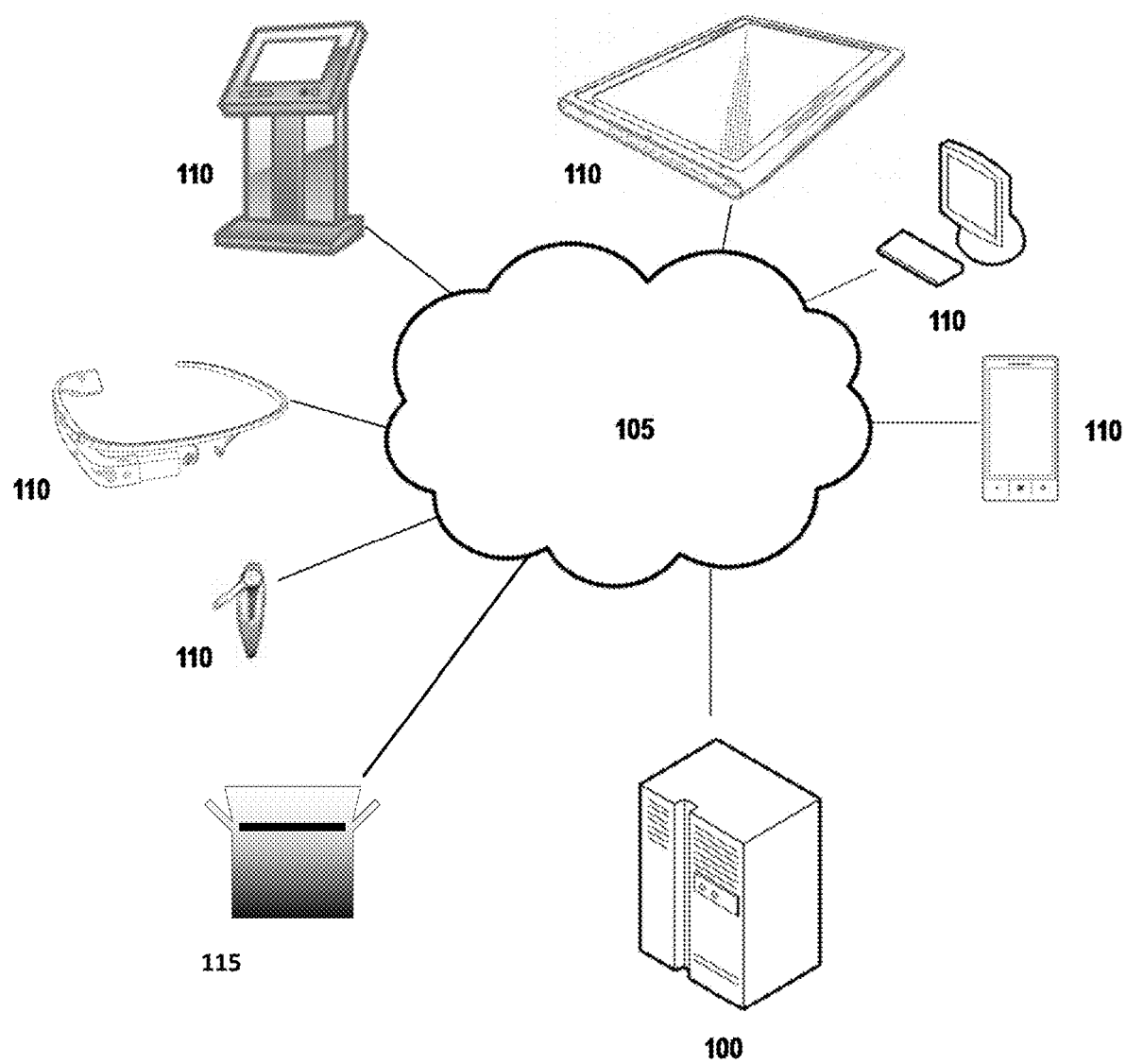
Figure 2:
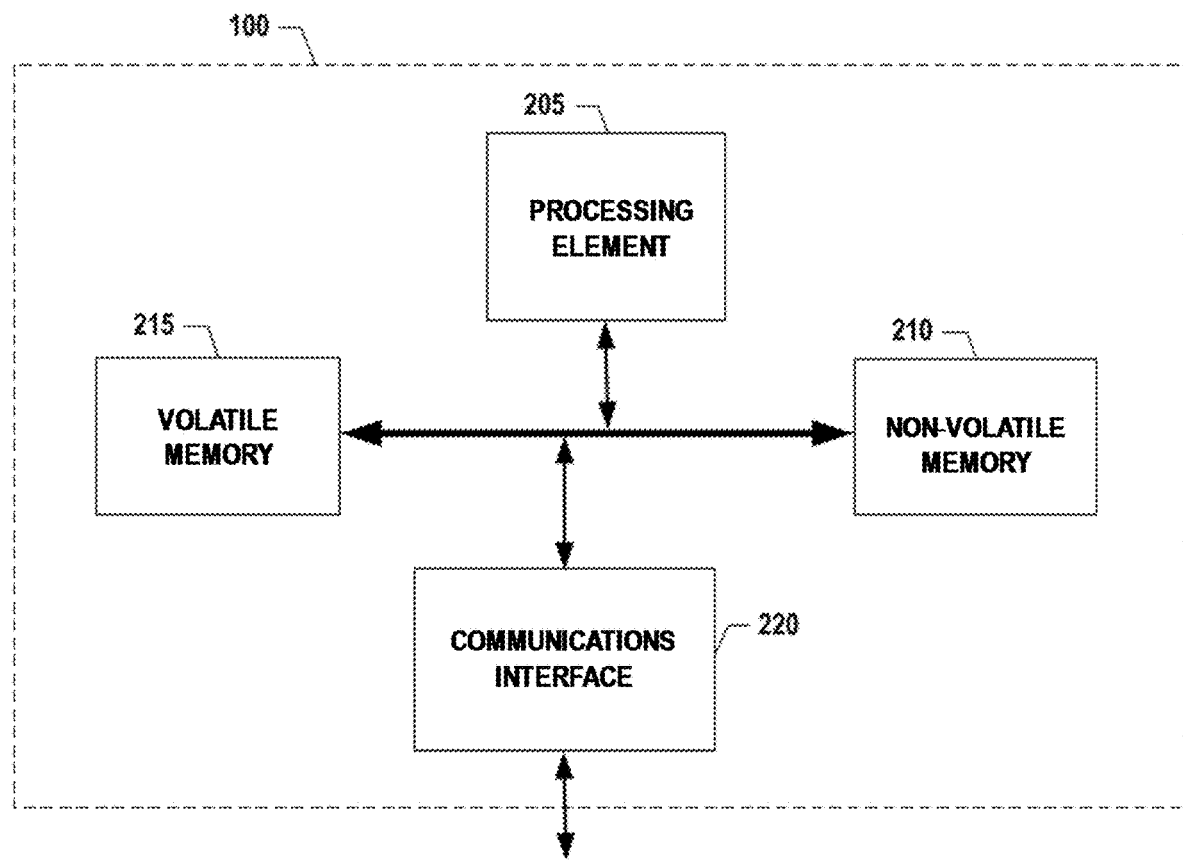
Figure 3:
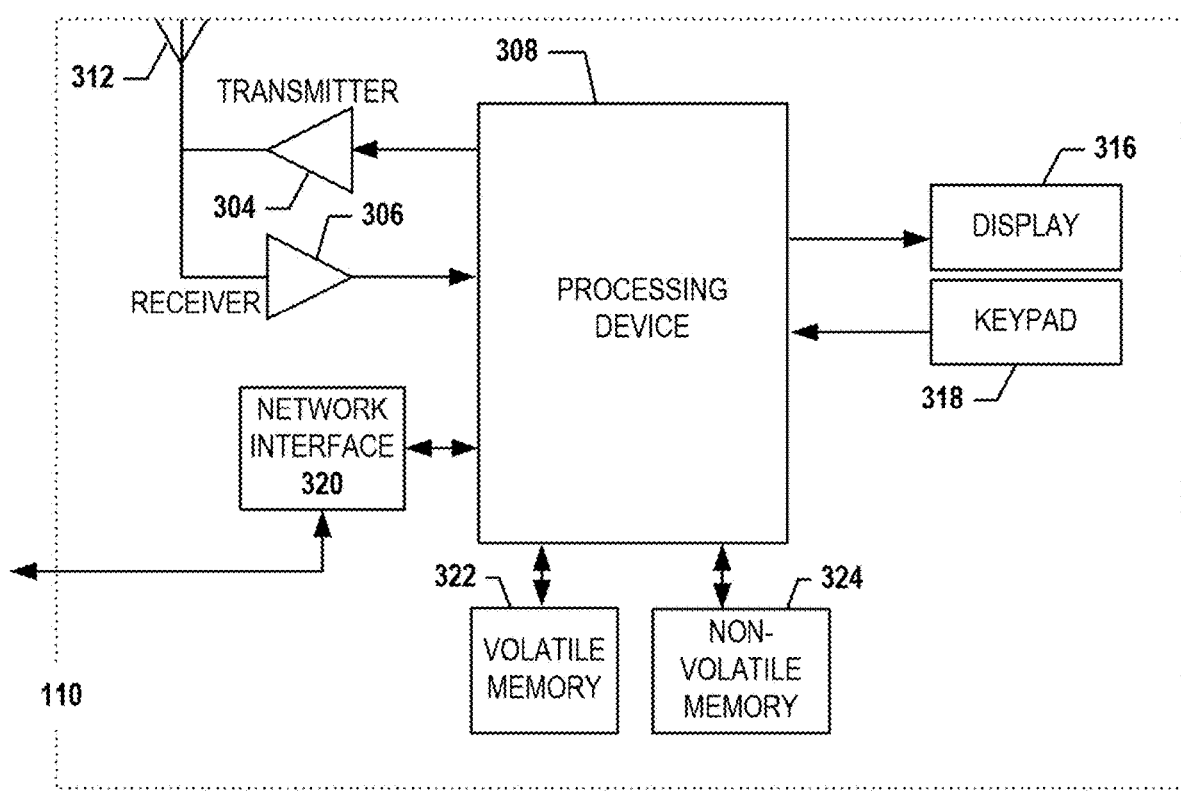
Figure 4:
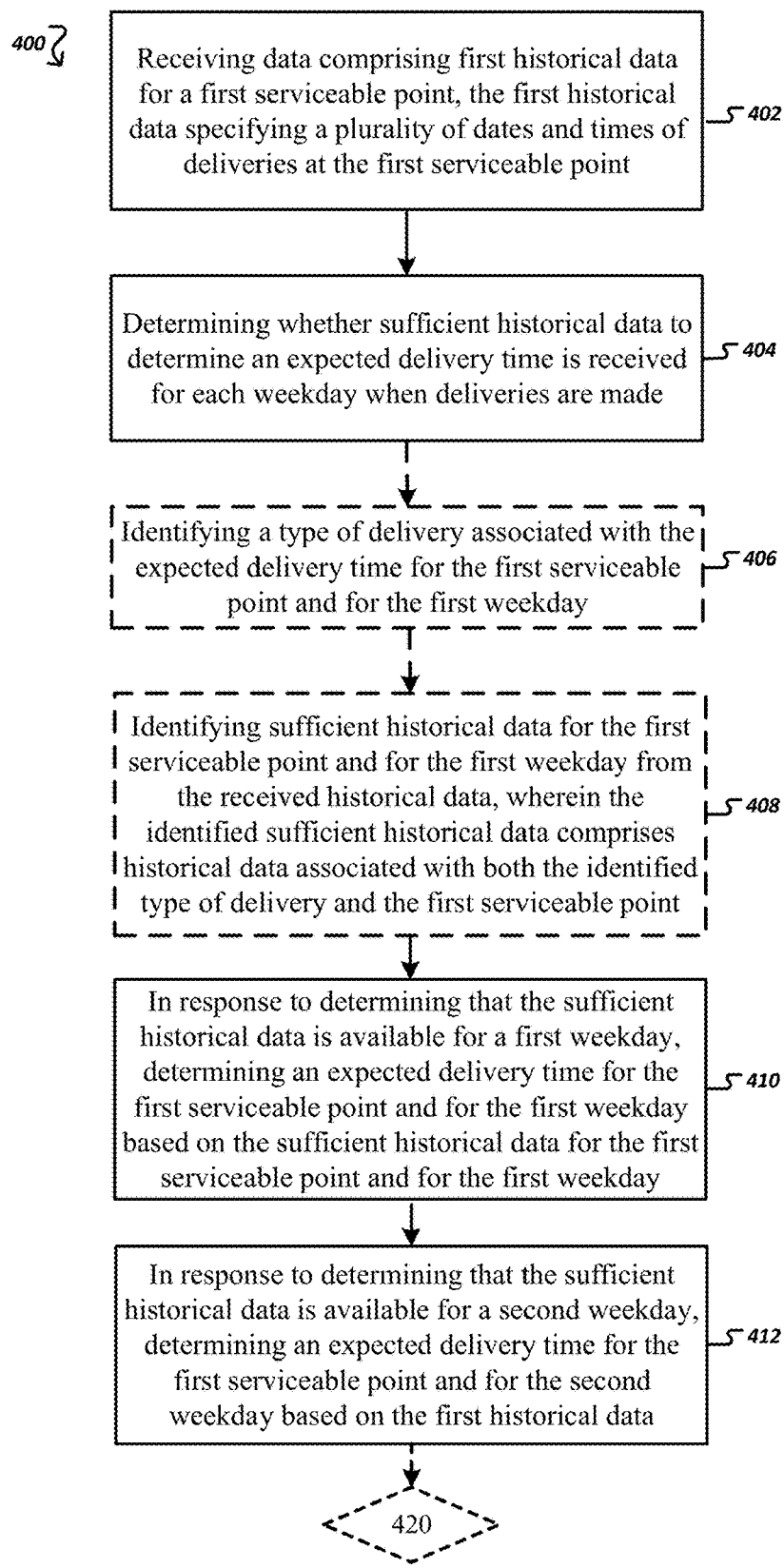
Figure 6:
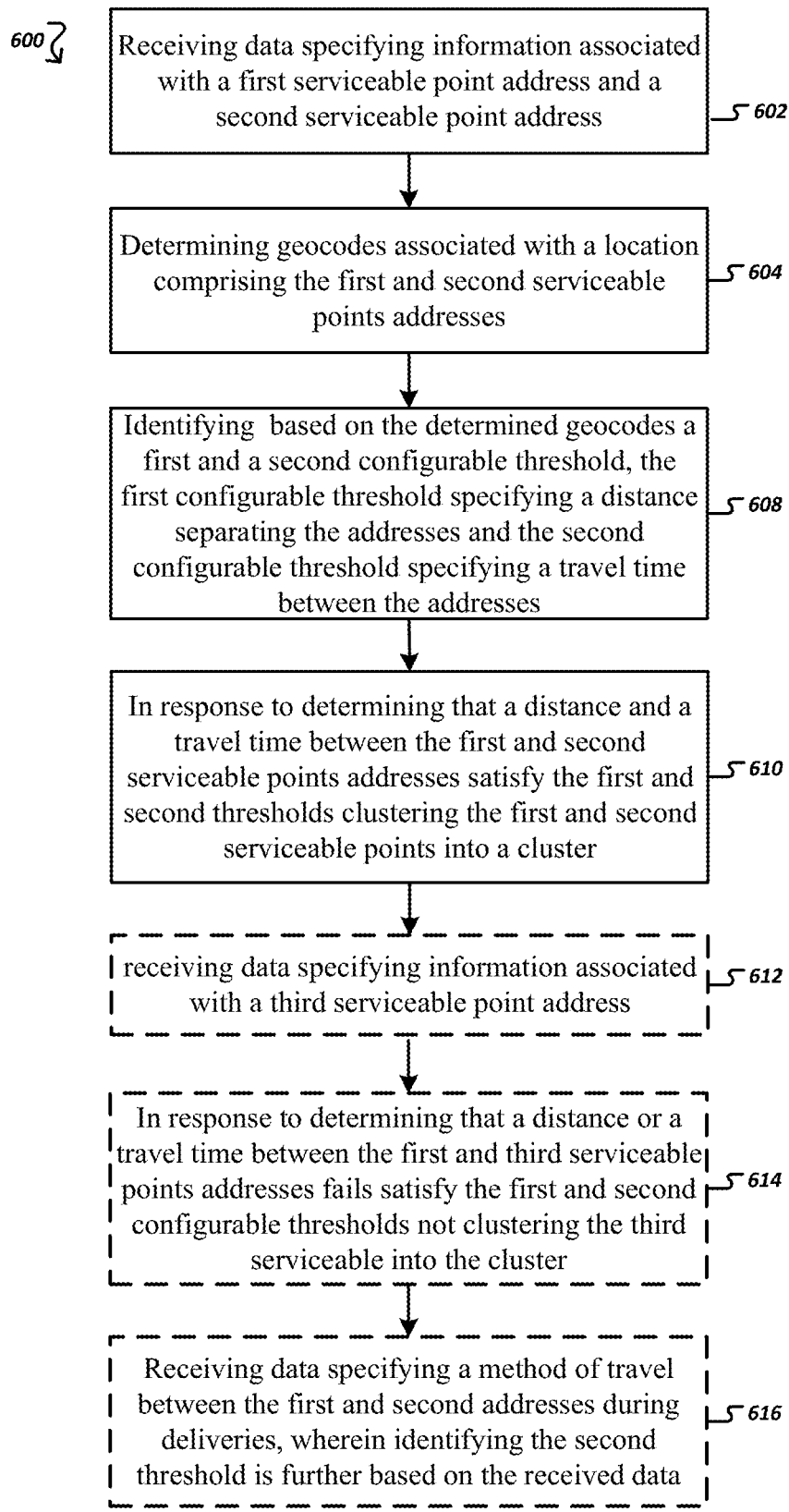
Figure 10:
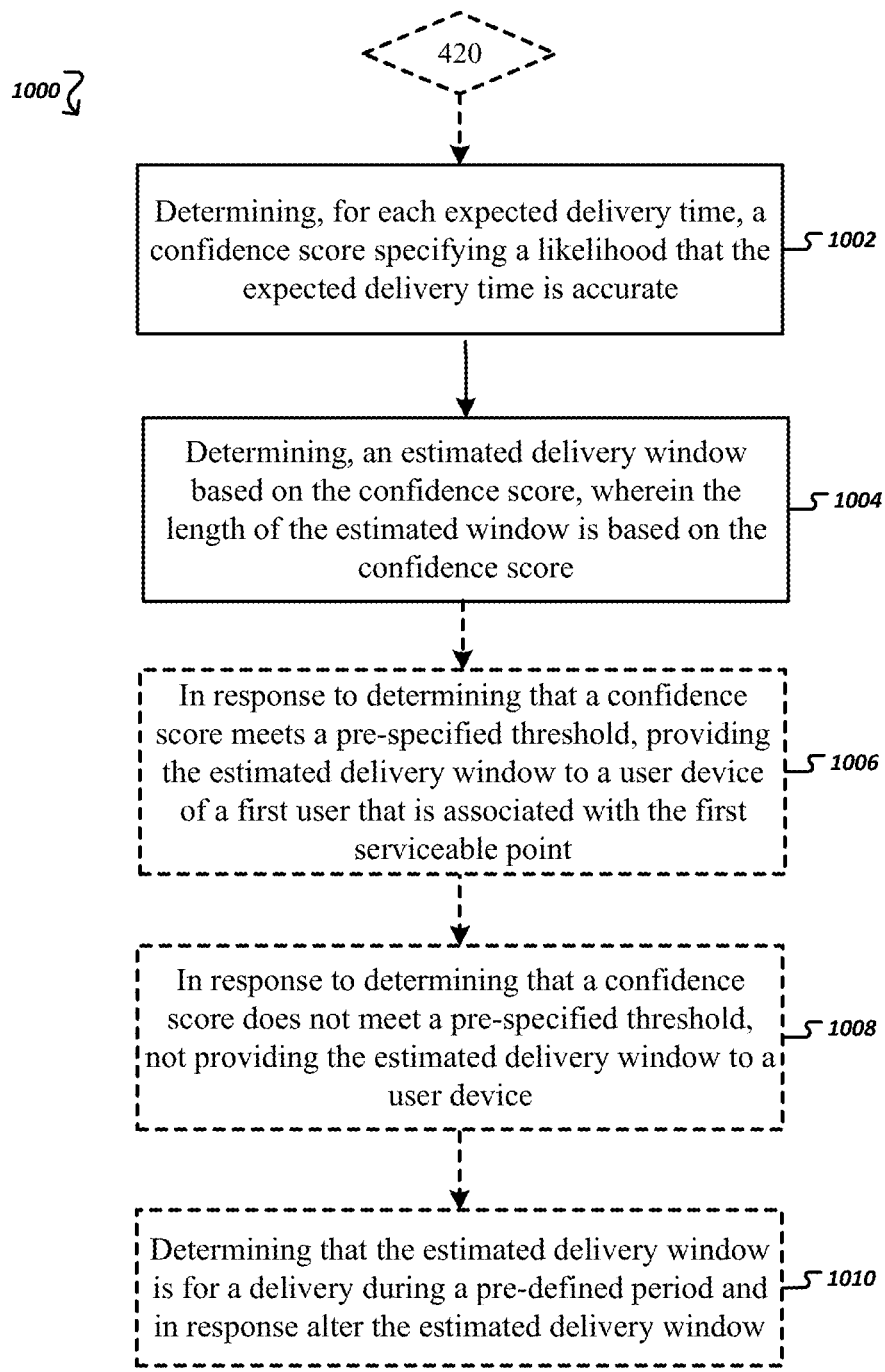

Having thus described the invention in general terms, reference will now be made to the accompanying drawings, which are not necessarily drawn to scale, and wherein:

FIG. 1 is an overview of a system that can be used to practice embodiments of the present invention;

FIG. 2 is an exemplary schematic diagram of a carrier computing entity according to one embodiment of the present invention;

FIG. 3 is an exemplary schematic diagram of a user computing entity according to one embodiment of the present invention;

FIGS. 4, 6, and 10 are flow charts illustrating exemplary information/data flows associated with completing various procedures and operations in accordance with various embodiments of the present invention;

FIGS. 5A, 5B, 5C, 9A, 9B, 12A, 12B, 12C, 12D depict exemplary past performances data, associated with different routes and serviceable points;

FIGS. 7A, 7B, 8A, 8B depict exemplary clustering/grouping of serviceable points and associated clustering/grouping thresholds; and FIGS. 11A and 11B depict exemplary 5B calculations of a confidence factor associated with an estimated delivery window.

FIGS. 12A-12D depict various customized window sizes (1 hr, 2 hr, 3 hr, 4 hr) estimating an estimated pick-up/delivery time.

DETAILED DESCRIPTION OF VARIOUS EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1 provides an illustration of an exemplary embodiment of the present invention. As shown in FIG. 1, this particular embodiment may include one or more carrier computing entities 100, one or more networks 105, and one or more user computing entities 110. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Carrier Computing Entity

FIG. 2 provides a schematic of a carrier computing entity 100 according to one embodiment of the present invention. A carrier may be a traditional carrier, such as United Parcel Service (UPS), FedEx, DHL, courier services, the United States Postal Service (USPS), Canadian Post, freight companies (e.g. truck-load, less-than-truckload, rail carriers, air carriers, ocean carriers, etc.), and/or the like. However, a carrier may also be a nontraditional carrier, such as Amazon, Google, Uber, ride-sharing services, crowd-sourcing services, retailers, and/or the like. In general, the terms computing entity, computer, entity, device, system, and/or similar words used herein interchangeably may refer to, for example, one or more computers, computing entities, desktop computers, mobile phones, tablets, printers (including thermal printers), phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information/data, and/or similar terms used herein interchangeably. The carrier computing entity 100 may also comprise or be in communication with various other systems, such as an Address Matching System (AMS), an Internet Membership System (IMS), a Customer Profile System (CPS), a Package Center Information System (PCIS), a Customized Pickup and Delivery System (CPAD), a Web Content Management System (WCMS), a Notification Email System (NES), a Fraud Prevention System (FPS), and a variety of other systems and their corresponding components.

As indicated, in one embodiment, the carrier computing entity 100 may also include one or more communications interfaces 220 for communicating with various computing entities, such as by communicating data, content, information/data, and/or similar terms used herein interchangeably that can be transmitted, received, operated on, processed, displayed, stored, and/or the like. For instance, the carrier computing entity 100 may communicate with user computing entities 110 and/or a variety of other computing entities.

As shown in FIG. 2, in one embodiment, the carrier computing entity 100 may include or be in communication with one or more processing elements 205 (also referred to as processors, processing circuitry, and/or similar terms used herein interchangeably) that communicate with other elements within the carrier computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the carrier computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In one embodiment, the carrier computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the carrier computing entity 100 with the assistance of the processing element 205 and operating system.

As indicated, in one embodiment, the carrier computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOC SIS), or any other wired transmission protocol. Similarly, the carrier computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the carrier computing entity 100 may include or be in communication with one or more input elements, such as a keyboard input, a mouse input, a touch screen/display input, motion input, movement input, audio input, pointing device input, joystick input, keypad input, and/or the like. The carrier computing entity 100 may also include or be in communication with one or more output elements (not shown), such as audio output, video output, screen/display output, motion output, movement output, and/or the like.

As will be appreciated, one or more of the carrier computing entity's 100 components may be located remotely from other carrier computing entity 100 components, such as in a distributed system. Furthermore, one or more of the components may be combined and additional components performing functions described herein may be included in the carrier computing entity 100. Thus, the carrier computing entity 100 can be adapted to accommodate a variety of needs and circumstances. As will be recognized, these architectures and descriptions are provided for exemplary purposes only and are not limiting to the various embodiments.

2. Exemplary User Computing Entity

A user may be an individual, a family, a company, an organization, an entity, a department within an organization, a representative of an organization and/or person, and/or the like. In one example, users may be carrier personnel, consignors/shippers, consignees/recipients, and/or the like and are used interchangeably herein. For instance, a user may operate a user computing entity 110 (also referred to herein customer computing entities and/or similar names) that includes one or more components that are functionally similar to those of the carrier computing entity 100. FIG. 3 provides an illustrative schematic representative of a user computing entity 110 that can be used in conjunction with embodiments of the present invention. In general, the terms device, system, computing entity, entity, and/or similar words used herein interchangeably may refer to, for example, one or more computers, computing entities, desktops, mobile phones, tablets, printers (including thermal printers), phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 110 can be operated by various parties. As shown in FIG. 3, the user computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information/data in accordance with air interface standards of applicable wireless systems. In this regard, the user computing entity 110 may be capable of operating with one or more air interface standards, communication protocols, modulation types, and access types. More particularly, the user computing entity 110 may operate in accordance with any of a number of wireless communication standards and protocols, such as those described above with regard to the carrier computing entity 100. In a particular embodiment, the user computing entity 110 may operate in accordance with multiple wireless communication standards and protocols, such as UMTS, CDMA2000, 1xRTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 110 may operate in accordance with multiple wired communication standards and protocols, such as those described above with regard to the carrier computing entity 100 via a network interface 320.

Via these communication standards and protocols, the user computing entity 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 110 can also download changes, add-ons, and updates, for instance, to its firmware, software (e.g., including executable instructions, applications, program modules), and operating system.

According to one embodiment, the user computing entity 110 may include location-determining aspects, devices, modules, functionalities, and/or similar words used herein interchangeably. For example, the user computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information/data can be determined by triangulating the user computing entity's 110 position in connection with a variety of other systems, including cellular towers, Wi-Fi access points, and/or the like. Similarly, the user computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user computing entity 110 to interact with and/or cause display of information/data from the carrier computing entity 100, as described herein. The user input interface can comprise any of a number of devices or interfaces allowing the user computing entity 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 110. As indicated, this may include a user application that is resident on the entity or accessible through a browser or other user interface for communicating with the carrier computing entity 100 and/or various other computing entities.

In another embodiment, the user computing entity 110 may include one or more components or functionality that are the same or similar to those of the carrier computing entity 100, as described in greater detail above. As will be recognized, these architectures and descriptions are provided for exemplary purposes only and are not limiting to the various embodiments.

3. Exemplary Item

In one embodiment, an item 115 may be any tangible and/or physical object. In one embodiment, an item 115 may be or be enclosed in one or more packages, envelopes, parcels, bags, goods, products, containers, loads, crates, items banded together, vehicle parts, pallets, drums, the like, and/or similar words used herein interchangeably. In one embodiment, each item 115 may include and/or be associated with an item/shipment identifier, such as an alphanumeric identifier. Such item/shipment identifiers may be represented as text, barcodes, tags, character strings, Aztec Codes, MaxiCodes, Data Matrices, Quick Response (QR) Codes, electronic representations, and/or the like. A unique item/shipment identifier (e.g., 123456789) may be used by the carrier to identify and track the item 115 as it moves through the carrier's transportation network. Further, such item/shipment identifiers can be affixed to items 115 by, for example, using a sticker (e.g., label) with the unique item/shipment identifier printed thereon (in human and/or machine readable form) or an RFID tag with the unique item/shipment identifier stored therein. Such items may be referred to as "connected" items 115 and/or "non-connected" items 115.

In one embodiment, connected items 115 include the ability to determine their locations and/or communicate with various computing entities. This may include the item 115 being able to communicate via a chip or other devices, such as an integrated circuit chip, RFID technology, Near Field Communication (NFC) technology, Bluetooth technology, Wi-Fi technology, and any other suitable communication techniques, standards, or protocols with one another and/or communicate with various computing entities for a variety of purposes. Connected items 115 may include one or more components that are functionally similar to those of the carrier computing entity 105 and/or the user computing entity 110 as described below. For example, in one embodiment, each connected item 115 may include one or more processing elements, one or more display device/input devices (e.g., including user interfaces), volatile and non-volatile storage or memory, and/or one or more communications interfaces. In this regard, in some example embodiments, an item 115 may communicate send "to" address information/data, received "from" address information/data, unique identifier codes, location information/data, status information/data, and/or various other information/data.

In one embodiment, non-connected items 115 do not typically include the ability to determine their locations and/or might not be able communicate with various computing entities or are not designated to do so by the carrier. The location of non-connected items 115 can be determined with the aid of other appropriate computing entities. For example, non-connected items 115 can be scanned (e.g., affixed barcodes, RFID tags, and/or the like) or have the containers or vehicles in which they are located scanned or located. As will be recognized, an actual scan or location determination of an item 115 is not necessarily required to determine the location of an item 115. That is, a scanning operation might not actually be performed on a label affixed directly to an item 115 or location determination might not be made specifically for or by an item 115. For example, a label on a larger container housing many items 115 can be scanned, and by association, the location of the items 115 housed within the container are considered to be located in the container at the scanned location. Similarly, the location of a vehicle transporting many items can be determined, and by association, the location of the items 115 being transported by the vehicle are considered to be located in the vehicle at the determined location. These can be referred to as "logical" scans/determinations or "virtual" scans/determinations. Thus, the location of the items 115 is based on the assumption they are within the container or vehicle, despite the fact that one or more of such items 115 might not actually be there.

Further, a vehicle may be a manned or an unmanned tractor, a truck, a car, a motorcycle, a moped, a Segway, a bicycle, a golf cart, a hand truck, a cart, a trailer, a tractor and trailer combination, a van, a flatbed truck, a vehicle, a drone, an aerial vehicle, an airplane, a helicopter, a barge, a boat, and/or any other form of object for moving or transporting people and/or items (e.g., one or more packages, parcels, bags, containers, loads, crates, items banded together, vehicle parts, pallets, drums, the like, and/or similar words used herein interchangeably).

III. Exemplary System Operation

As described above, the carrier computing entity 100 and/or user computing entity 110 may be configured for storing information/data associated with an item and/or an action/event (e.g., pick-up, delivery, and/or the like), providing information/data associated with an item and/or action/event to a user, providing tools for a user accessing or providing information/data associated with an item and/or action, and/or aiding in user access and provisioning of information/data associated with an item and/or action.

According to various embodiments, the carrier computing entity 100 and/or user computing entity 110 can provide and/or aid in the access and provisioning of information/data in accordance with user instructions and/or input received via the carrier computing entity 100 and/or user computing entity 110 (e.g., via a user interface). The user interface may be accessible from a user computing entity 110 (e.g., in communication with the carrier computing entity 100 via the network 105). For example, in various embodiments, a user may log in to the carrier computing entity 100 from a user computing entity 110 (e.g., by opening a log-in page and entering a user ID and password using display 316 and keypad 318). The carrier computing entity 100 may be configured to recognize any such log-in request, verify that the user has permission to access the system (e.g., by confirming the user ID, password, and/or other credentials are valid), and present/provide the user with a user interface (e.g., displayed on display 316). In other embodiments, user log-in is not required to access the user interface. The user interface may be used to access, request, and/or receive delivery information/data. For example, the user interface may be used to access, request, and/or receive an estimated delivery window for an item.

As described herein, embodiments of the present invention recognize that being able to accurately estimate a time, window, range, and/or similar words used herein interchangeably can greatly enhance various business and customer satisfaction aspects. In one implementation, embodiments of the present invention may selectively choose portions of historical information/data for estimating a delivery window. In some implementations, similar historical information/data may be aggregated to determine estimated windows based on the aggregated historical information/data. In some implementations, information/data for proximate serviceable points may be clustered and used to determine estimated windows for any location within the cluster/group. In some implementations, confidence score may be determined in order to determine an estimated window size based on the confidence scores. An exemplary process for estimating pick-up/delivery windows is described below with reference to FIGS. 4, 5A, 5B, and 5C.

1. Exemplary Serviceable Points

In one embodiment, a serviceable point, serviceable point addresses, and/or similar words used herein interchangeably may be any identifiable location, such as one or more addresses, lockers, access points, delivery locations, parking locations, sidewalks, highways, trails, alleys, paths, walkways, streets, street segments, entrance or exit ramps, roads, longitude and latitude points, geocodes, zip codes, area codes, cities, counties, states, provinces, countries, stops (e.g., pick up stops, delivery stops, vehicle visits, stops) geofenced areas, geographic areas, landmarks, buildings, bridges, and/or other identifiable locations. For example, a serviceable point may be a residential location, such as one or more homes, one or more mobile homes, one or more apartments, one or more apartment buildings, one or more condominiums, one or more townhomes, one or more points at such locations, and/or the like. The serviceable point may also be any specific location at a residential location (e.g., front door of a residence, side door of a residence, and/or the like). A serviceable point may also be a commercial location, such as one or more stores in a mall, one or more office buildings, one or more office parks, one or more offices of an apartment complex, one or more garages, one or more lockers or access points, one or more warehouses, one or more restaurants, one or more stores, one or more retail locations, one or more points at such locations, and/or the like. The serviceable point may also be any specific location at a commercial location, e.g., (e.g., front door of a commercial, dock of a commercial location, and/or the like). A serviceable point may be one or more streets, one or more street segments, one or more zones, one or more areas, one or more latitude and/or longitude points (e.g., 33.7869128, −84.3875602), one or more geocodes, and/or the like. A serviceable point may be any identifiable location. As will be recognized, a variety of approaches and techniques can be used to adapt to various needs and circumstances.

In certain embodiments, serviceable points can be represented digitally in geographical maps as map information/data. Map information/data may include boundary, location, and attribute data corresponding to the map elements. As will be recognized, the map information/data can be stored using a variety of formats, layers, and/or the like—including shapefiles, ArcMaps, geodatabases, coverages, imagery, rasters, computer-aided drafting (CAD) files, other storage formats, and/or the like. For instance, an appropriate computing entity may store/record map data as a part of a digital map, e.g., as part of a feature layer, raster layer, service layer, icons/graphics layer, geoprocessing layer, basemap layer, satellite layer, street network layer, points of interest layer, serviceable point layer, and/or the like. The term digital map is intended to include any map that can electronically display geographic areas.

As will be recognized, serviceable points need not be addresses. For instance, a serviceable point can be a longitude and latitude or geocode (e.g., the recorded location of a vehicle stop). Further, serviceable points can be represented in digital maps as being accessible by one or more street networks or street segments of a street network. A "street network" is collection of street segments that comprise navigable, traversable, travelable, and/or similar words used herein interchangeably roads, streets, highways, paths, trails, walkways, entrance and exit ramps, bridges, sidewalks, alleys, and/or the like that can be used to access serviceable points. Similarly, map elements, street networks, and/or the like can be represented in digital maps as navigable/traversable/travelable segments or points for traveling to and/or from serviceable points.

In one embodiment, an appropriate computing entity can store information/data associated with each map element in an object or other data structure. The object or data structure may comprise a variety of information/data associated with each map element, such as a consignee/recipient name, pickup or delivery identifier, street name, street number, street prefix, street suffix, street type, city, state, province, territory, country, postal code, residential or commercial indicator, street classification, directionals (e.g., one way <specific to which way> or both ways), longitude and latitude, geocode, location identifier, and/or the like. Similarly, the appropriate computing entity can store information/data associated with each street segment of the street network in an object or other data structure. The object or data structure may comprise a variety of information/data associated with each street segment, such as a street segment identifier, street name, street number range, street prefix, street suffix, street type, city, state, province, territory, country, postal code, street classification, directionals (e.g., one way <specific to which way> or both ways), longitude and latitude points defining the street segment, speed limits of one or more portions of the street segment, and/or the like. For example, in one embodiment, a map element may be represented by and/or associated with a longitude and latitude, a geocode, a nearest street segment, an address, and/or the like. Similarly, street segments of street networks may be represented by or associated with a street name, a segment identifier, a connecting node, an address or address range, a series of longitude and latitude coordinates, and/or the like that define the overall shape and location of the street segment. As will be recognized, a variety of other approaches and techniques can be used to adapt to various needs and circumstances.

In one embodiment, the appropriate computing entity may store digital maps. In another embodiment, the mapping/routing computing may be in communication with or associated with one or more mapping websites/servers/providers/databases (including providers such as maps.google.com, bing.com/maps/, mapquest.com, Tele Atlas®, NAVTEQ®, and/or the like) that provide map information/data of digital maps to a variety of users and/or entities. Using the digital maps, an appropriate computing entity can provide map information/data, for example, about map elements (e.g., their locations, attributes, and/or the like) and/or their corresponding street networks based on map information/data. An appropriate computing entity (e.g., the management computing entity 100 or the one or more mapping websites/servers/providers/databases) can also provide map information/data, for example, about the geographic areas, regions, groupings, routes, paths, regions, and/or similar words used herein interchangeably about the different locations on the street networks. For instance, the map information/data may include a route for delivering one or more items to different locations, the most efficient order for delivering items to the locations, directions for traveling to and/or from the serviceable points, the estimated distance for traveling to and/or from the serviceable points, the expected time for traveling to and/or from the serviceable points, and/or the like. The map information/data may also include other information/data about map elements and/or traveling to and from serviceable points, such as current estimated speeds for associated street segments, historical speeds for associated street segments, nearest street segments, posted speed limits for associated street segments, interpolated locations of serviceable points, reverse geocoded locations of serviceable points, latitude and longitude points of serviceable points, distances between various locations, directions, stop orders, and/or the like.

In one embodiment, the appropriate computing entity can identify, retrieve, determine, and/or similar words used herein interchangeably map information/data associated with serviceable points, map elements, street networks, routes, paths, and/or the like. For example, the mapping/routing computing entity 110 can identify the map elements by address, address portions (e.g., street number, street name, type, and/or the like), latitude and longitude points, routes, paths, geographic areas, location identifiers, and/or the like. Table 1 below shows a textual view of eighteen map elements, each associated with a route, a stop, an address, a city, a state, a longitude and latitude, and/or the like.

TABLE 1

| Route: Stop | Address | City | State |
|---|---|---|---|
| 10A: S1 | 1 STREET ADDRESS | ANYTOWN | GEORGIA |
| 10A: S2 | 2 STREET ADDRESS | ANYTOWN | GEORGIA |
| 10A: S3 | 3 STREET ADDRESS | ANYTOWN | GEORGIA |
| 10A: S4 | 4 STREET ADDRESS | ANYTOWN | GEORGIA |
| 10A: S5 | 5 STREET ADDRESS | ANYTOWN | GEORGIA |
| 10A: S6 | 6 STREET ADDRESS | ANYTOWN | GEORGIA |
| 11C: S1 | 7 STREET ADDRESS | ANYTOWN | GEORGIA |
| 11C: S2 | 8 STREET ADDRESS | ANYTOWN | GEORGIA |
| 11C: S3 | 9 STREET ADDRESS | ANYTOWN | GEORGIA |
| 11C: S4 | 10 STREET ADDRESS | ANYTOWN | GEORGIA |
| 11C: S5 | 11 STREET ADDRESS | ANYTOWN | GEORGIA |
| 11C: S6 | 12 STREET ADDRESS | ANYTOWN | GEORGIA |
| 13B: S1 | 13 STREET ADDRESS | ANYTOWN | GEORGIA |
| 13B: S2 | 14 STREET ADDRESS | ANYTOWN | GEORGIA |
| 13B: S3 | 15 STREET ADDRESS | ANYTOWN | GEORGIA |
| 13B: S4 | 16 STREET ADDRESS | ANYTOWN | GEORGIA |
| 13B: S5 | 17 STREET ADDRESS | ANYTOWN | GEORGIA |
| 13B: S6 | 18 STREET ADDRESS | ANYTOWN | GEORGIA |

The appropriate computing entity can also identify the interpolated or reverse geocoded locations on the street networks for one or more of the locations, for instance. And, the mapping/routing computing entity 110 can reverse geocode the latitude and longitude points of the locations if available, such as the location of 1 Street Address, Anytown, GA being located at 33.7869128, −84.3875602. As will be recognized, a variety of other techniques and approaches can be used to adapt to various needs and circumstances.

2. Exemplary Process for Estimating Pick-Up/Delivery Windows

FIG. 4 is an exemplary process for estimating times, windows, ranges, and/or similar words used herein interchangeably based on historical information/data. In some implementations, the process 400 for estimating pick-up/delivery windows begins with receiving or accessing information/data comprising first historical information/data for a first serviceable point. For example, the first historical information/data may specify historical pick-up or delivery information/data, such as dates and times of previous pick-ups and deliveries at the first serviceable point (402). To do so, the process 400 may receive, access, or request historical information/data of previous pick-ups and/or deliveries at a serviceable point during one or more configurable time periods (e.g., days, weeks, months, years, and/or the like). In some implementations, the historical information/data is arranged in a tabulated format specifying the pick-up and/or delivery times for each day of the week as shown in FIG. 5A. In some implementations, the historical information/data associates each pick-up and/or delivery at a serviceable point with one or more routes. A route, for example, may be a delivery route of a particular driver, a particular delivery vehicle, a particular delivery service level, and/or a particular driving path. Depending on the day of the week or time of the year, a serviceable point may be serviced by one or more routes. The historical information/data may be arranged in a tabulated format specifying the pick-up and/or delivery times for each weekday and/or for each route as shown in FIGS. 5A, 5B, and 5C. For example, based on FIG. 5A, it can be determined that the consignee/recipient "Smith" at 123 Main Street received an item Monday 11:45 AM by the carrier person driving Route 10A that day. This historical information/data can provide such information/data for all pick-ups and/or deliveries for a serviceable point.

In some implementations, the historical information/data may be processed by the carrier computing entity 100 for the configurable time period to determine average delivery times for each day, each service level for each day, each route for each day, combinations thereof, and/or the like. For example, with reference to FIG. 5B, the average for all routes on Tuesdays at the first serviceable point is 1:46 PM based on the estimated delivery times at 2:00 PM, 1:30 PM, and 2:05 PM. In other implementations, a weighted average and/or a mode may be determined as the estimated pick-up/delivery time. In some implementations, if one or fewer delivery times are available for a weekday, no average is determined. In this example, only a single delivery is available for Monday based on the historical information/data for the configurable time period. Accordingly, no average delivery time is determined for the first serviceable point for Mondays. Similarly, averages for each route may be determined for all days of the week. For example, an average may be determined for route 10A on Tuesdays. As shown in FIG. 5B, the average for route 10A on Tuesdays is 2:02 PM based on delivery times at 2:00 PM and 2:05 PM. Similarly, an average for route 11C may be determined for all days of the week by accessing all pick-up and delivery records for the configurable time period. For example, as shown in FIG. 5B, the average for route 11C for all week days is 2:06 PM based on delivery times at 1:15 PM, 2:05 PM and 3:50 PM. As described above, weighted averages and modes may be used in lieu of standard averages. Similarly, averages may not be determined for data sets that have one or fewer entries. In some implementations, a table may be created for each type of delivery service level (e.g., Next Day Air, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, and/or the like). For example, Ground (5 businesses days) may have a table different from a table for Express delivery (2 day delivery). Each table may include averages for the respective delivery service levels. Tables similar to 5A and 5B, the corresponding historical information/data may be stored in a data store belonging to or associated with carrier computing entity 100.

The process 400 may continue with determining whether there is sufficient historical information/data to determine an estimated pick-up/delivery time for a given day of the week (404). For example, the process 400 may access table 5A or data representing table 5A to determine whether sufficient historical information/data has been received or is available to determine an estimated pick-up/delivery time. For example, with three actions/events recorded in table 5A for the configurable time period, the carrier computing entity 100 may determine that there is sufficient information/data to determine an estimated pick-up/delivery time on Tuesdays at the first serviceable point or on Tuesdays at the first serviceable point for Route10A. Similarly, the carrier computing entity 100 may determine that there is not sufficient historical information/data for the configurable time period to determine a delivery window for Mondays, based on table 5A.

In some implementations, the process 400 may continue with optional step 406 shown in phantom. The process 400 may identify a type of delivery service level associated with the estimated pick-up/delivery time for the first serviceable point for each delivery (406). For example, the user may select to ship an item using a variety of delivery service levels. In practice, the carrier computing entity 100 may identify that the first type of delivery service level is Ground, Next Day Air, and/or the like. The process 400 may continue with optional step 408, shown in phantom. The process 400 may identify historical information/data for the first serviceable point and for the corresponding day of the week, for example, from the received historical information/data. The historical information/data may be associated with both the identified type of delivery service level and the first serviceable point (408). For example, the carrier computing entity 100 may identify from table 5B, information/data associated with Ground deliveries to 123 Main Street location. Note that the table 5B does not include sufficient data for estimating a delivery window for Mondays. Similarly, the carrier computing entity 100 may identify a similar table or data for the Express delivery service level and/or the like.

In response to determining that sufficient historical information/data is available for a day of the week (e.g., first weekday), the process 400 may continue with determining an estimated pick-up/delivery time, window, or range for a serviceable point for each day, each service level for each day, each route for each day, combinations thereof, and/or the like. As noted, the estimated pick-up/delivery time, window, or range may be determined for each day of the week and/or delivery service level for each day of the week (410). In some implementations, when sufficient information/data is available, average estimated pick-up/delivery times can be determined for each day of the week, each delivery service level, each route, all routes, and/or the like. A delivery window may be estimated based on the determined averages (include mean, mode, median). In some implementations, the estimated windows are of a fixed size on either side of the estimated pick-up/delivery time (e.g., 1 hour, 3 hours, 4 hours, 5 hours, 8 hours). In other implementations, customized windows may be generated for each delivery and/or serviceable point. Customized windows will be discussed in more detail in the following sections. FIG. 5C shows a fixed 3 hours delivery window that is determined based on the calculations above of table 5B.

The carrier computing entity 100 can repeat the process for each day of the week using delivery service levels and/or various other parameters (e.g., weather conditions, network volume, traffic, personnel, and/or the like). For example, after determining that there is insufficient historical information/data to make a determination for the first weekday, the carrier computing entity 100 can determine if there is sufficient historical information/data to make the determination for the second weekday (e.g., Tuesday). In response to determining that sufficient historical information/data is available for the second weekday, the carrier computing entity 100 can determine that the estimated pick-up/delivery time for the first serviceable point for the second weekday based on the historical information/data (412). For example, with reference to FIGS. 5A and 5B, Mondays do not have sufficient historical information/data available for determining an estimated pick-up/delivery time for the 123 Main Street location. Accordingly, the carrier computing entity may use the information/data of FIG. 5A to determine an overall estimated pick-up/delivery time based the available data for all routes and all days. For example, as shown in FIG. 5B, the overall estimated pick-up/delivery time based on all available data for all routes and all days is 2:22 PM. This estimate may be an average of all delivery times for the serviceable point. In some implementations, this estimate may be a weighted average or a mode. The fixed 3 hours window may be applied to this delivery time to obtain a window of 12:30-4:30 PM as shown in FIG. 5C. This window may be used for Tuesday deliveries at the 123 Main Street location.

Generally, at the time of shipping, it is unknown which of the available routes for delivering an item to a particular serviceable point may be used. For example, at the time of shipping, it may be unknown whether a delivery to 123 Main Street will be delivered via route 10A, 11C, or 13B. Accordingly, the estimates for a weekday corresponding to the weekday of delivery may be provided to the customer. However, once route is determined, an updated window may be provided to the customer. For example, a delivery to the 123 Main Street location may be scheduled for a Tuesday via an unknown route. Accordingly, the customer may be provided with an estimated delivery window between 11:45 PM and 3:45 PM. Once a route is determined for the delivery, the estimated window may be updated and provided to the customer via an interface or one or more notifications/messages. For example, if the carrier computing entity 100 determines that route 10A will be used to make the Tuesday delivery to the 123 Main street location, the delivery window may be updated to 12:00-4:00 PM. On the other hand, if the carrier computing entity 100 determines that route 11C will be used to make the Tuesday delivery to the 123 Main street location, the delivery window may not be updated since there is insufficient information/data to determine an estimate for the 11C route on Tuesdays. In some implementations, the size of the updated estimated window may be smaller. For example, the update may specify that the estimated delivery window is between 12:00-3:45. Generally, the estimated windows may be updated based on a plurality of factors and based on various types of information/data as the information/data becomes available. For example, traffic information/data may be used to update estimated pick-up/delivery windows. The lack of historical information/data may significantly affect the accuracy of the estimated pick-up/delivery windows. In some implementations, historical information/data for proximate serviceable points may be used for estimating pick-up/delivery windows for the proximate serviceable points. Clusters may be created according to configurable rules. These rules may ensure that the estimated pick-up/delivery windows remain accurate. In some implementations, a cluster of serviceable points may be a group of serviceable points each having historical information that may be used interchangeably with other serviceable points in the cluster for estimating delivery and/or pick-up times and/or windows. In some implementations, clustering may require one or more configurable time and/or distance thresholds to be met. For example, two serviceable points may be clustered if they meet a configurable time and/or distance thresholds. The clustering/grouping of serviceable points is discussed in more detail in the following section.

Figures 7A, 7B:
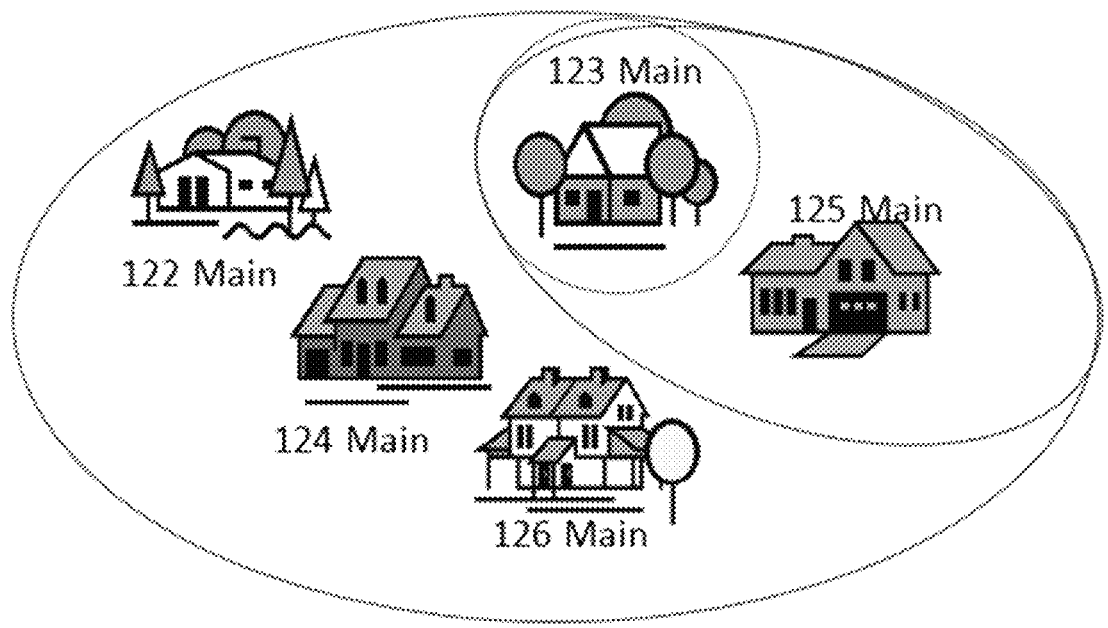

3. Exemplary Process for Clustering/Grouping Serviceable Points and Estimating Pick-Up/Delivery Windows Based on the Same FIG. 6 is an exemplary process 600 flow for clustering/grouping proximate serviceable points. Serviceable points may be clustered according to one or more thresholds, including time, distance, or time and distance. For example, serviceable points may be clustered as shown in FIG. 7B according to the one or more thresholds of FIG. 7A. In some implementations, the one or more thresholds may be based on the distance between serviceable points, the travel times between serviceable points, and/or the distance and time between serviceable points.

In one embodiment, a configurable distance threshold may be a configurable threshold indicating a configurable distance threshold between serviceable points, below which serviceable points may be clustered. The distance between two serviceable points (e.g., R1:1 and R1:2) may be determined using a variety of techniques an approaches. For example, in one embodiment, the distance between two serviceable points can be determined based on longitude and latitude coordinates, for example of the two serviceable points. In turn, the determined differences between the longitude and latitude coordinates may be used to determine whether the two serviceable points satisfy the configurable distance threshold based on travel distance. In other implementations, the map information/data and/or telematics information/data can be used to make similar determinations.

In another embodiment, the distance between two serviceable points can be determined from telematics information/data (e.g., odometer or hubometer information/data collected while a delivery vehicle traveled from the first point to the second point) and/or map information/data (e.g., routing through a street network). For instance, a vehicle may include a plurality of vehicle sensors, readers, cameras, and/or the like configured for generating and/or collecting telematics data indicative of various vehicle dynamics, such as engine ignition, engine speed, vehicle speed, vehicle location, and the status of various vehicle components. The vehicle sensors may be controlled by the telematics device, which may be positioned on or within the vehicle. In controlling the various vehicle sensors, the telematics device is able to capture and store telematics data from the various vehicle sensors according to a programmed logic and associate the captured telematics data with contextual data (e.g., date, time, location). The carrier computing entity 100 can determine the distance traveled between two or more serviceable points (e.g., stops) based on telematics information/data collected by the vehicle. In one embodiment, the carrier computing entity 100 determines the distance by first identifying telematics information/data that indicates the distance traveled by a delivery vehicle (e.g., odometer reading) that was captured (a) at the start of a first stop (e.g., when the vehicle's engine was turned off, when the vehicle slowed to a stop immediately prior to the start of the stop, and/or the like) or (b) at the end of the first stop (e.g., when the vehicle's engine was started, when the vehicle accelerated from standstill, and/or the like, and/or the like). Then, the carrier computing entity 100 can identify telematics information/data that indicates the distance traveled by the vehicle either to the next stop (e.g., when the vehicle's engine was turned off again, when the vehicle slowed to a stop immediately prior to the start of the next stop, and/or the like) or from the previous stop (e.g., when the vehicle's engine was started again, when the vehicle accelerated from standstill, and/or the like). The carrier computing entity 100 may then determine the distance traveled by the vehicle between the stops and store the result (e.g., 3 miles). In other embodiments, the carrier computing entity 100 may similarly determine traveled distances and/or the travel time for stops using the GPS-based techniques, map information/data, and/or the like.

Additionally or alternatively, a threshold time may be a configurable threshold indicating a configurable travel time threshold between serviceable points, below which serviceable points may be clustered. In one implementation, the travel time between serviceable points can be determined from map information/data. In another implementation, the travel time between serviceable points (e.g., R2:2 and R2:3) may be determined using telematics information/data and/or information/data provided delivery vehicle drivers and/or delivery personnel operating user computing entities 110 while delivering items to serviceable points. For example, a delivery vehicle driver may provide updates to carrier computing entity 100 indicating delivery completion at each serviceable point. For example, a driver may use a user computing entity 110 in communication with carrier computing entity 100 to provide an update indicating that the driver completed deliveries at a particular serviceable point. In one implementation, the carrier computing entity 100 may automatically determine that a driver completed a delivery at a first serviceable point based on the driver recording a stop complete event via his user computing entity 110. Additionally, this can be determined based on telematics information/data indicating that a vehicle's engine has started or that the vehicle has moved or accelerated from the first serviceable point after stopping for a threshold period of time. The carrier computing entity 110 may then determine that the driver arrives at the next serviceable point (time to stop (tts)). The time to stop can include walking time, driving time, combinations thereof, and/or the like. For example, the driver may use a user computing entity 110 in communication with carrier computing entity 100 to provide an update indicating that the driver started or completed deliveries at a particular serviceable point. Additionally, the telematics information/data can indicate that a vehicle's engine has stopped or turned off at the next serviceable point. The travel time from the first serviceable point to the next serviceable point is then determined by the difference in the time the stop at the first serviceable point was completed and the stop at the next serviceable point began. That is, the carrier computing entity 100 may determine the travel time (e.g., walking time, driving time, combinations thereof, and/or the like) between two serviceable points (e.g., for pick-ups or deliveries). In turn, the travel time between the serviceable points may be used to determine whether the two serviceable points satisfy the configurable travel time threshold based on the travel time between serviceable points.

The carrier computing entity 100 can make these determinations on an area, route, stop, or driver basis. The carrier computing entity 100 may receive some or all of the following for each serviceable point, stop, or other events of interest: the route number (e.g., 10A, 11C, 13B, the stop number (e.g., S1, S 2, S 3), the type of stop (e.g., delivery or "DL," pickup or "PU," return to building or "RTB, and/or the like), the distance from the previous stop (e.g., 0.5 miles), the distance to the next stop, the time when the driver begins the stop (e.g., 10:44:00), the time when the driver completes the stop (e.g., 10:54:00), the total time elapsed while executing the stop (e.g., 10.00 minutes), the time elapsed (e.g., walking time, driving time, combinations thereof, and/or the like) traveling from the previous stop (e.g., 2.00 minutes), the total time elapsed traveling from the previous stop and executing the current stop (e.g., 6.00 minutes), the amount of time the driver was on the property of a shipping hub during the time-to-stop period (e.g., 23.63 minutes), the amount of non-travel time to stop occurring between the completion of the previous stop and the beginning of the current stop (e.g., 5.85 minutes), the amount of pure travel time occurring between the completion of the previous stop and the beginning of the current stop (e.g., 45.37 minutes), the amount of lunch time occurring between the completion of the previous stop and beginning of the current stop (e.g., 30.00 minutes), the amount of driver-coded delay time occurring between the completion of the previous stop and the beginning of the current stop (e.g., 1.50 minutes), the total number of units, such as freight or packages, picked up or delivered at the current stop (e.g., 3 units), and the total weight of freight or packages picked up or delivered at the current stop. These features are described in greater detail in U.S. application Ser. No. 14/716,160, which is hereby incorporated herein in its entirety by reference.

In some implementations, the carrier computing entity 100 may receive package delivery information/data. In some implementations, the carrier computing entity 100 may receive updated package delivery information/data frequently. For example, carrier computing entity 100 may receive package delivery information/data updates hourly, daily, weekly, and/or monthly. In some implementations, the carrier computing entity 100 may also receive information/data associated with serviceable points. For example, the carrier computing entity 100 may receive serviceable point information/data including street addresses, variation of the street addresses, residential commercial status, and consignee/recipient names for the addresses. For example, the address 123 SW 1st St, Suite 1A may be a variation of the address 123 Southwest 1st Street, Ste. 1A. In some implementations, an address may associated with one or more serviceable points. For example, Apt 1 and Apt 2 of 123 Main Street may be two different serviceable points located at the same address (123 Main Street). Similarly, in some implementations, a serviceable point may be associated with multiple street addresses. For example, 456 Central Avenue, Suite 1A and Suite 2A may share a single mailroom for deliveries. The above information/data may be used to establish or update established serviceable points. With the serviceable points established, relationships among the serviceable points can be established if they satisfy configurable time, distance, and/or time and distance thresholds. Then, serviceable point clusters and/or serviceable point groups may be created according to the determined relationships.

In some implementations, the carrier computing entity 100 may receive and/or fetch information/data specifying the distance and/or travel time (e.g., walking time, driving time, combinations thereof, and/or the like) between serviceable points. In some implementations, the carrier computing entity 100 may match vehicle stops with serviceable point information/data. In one embodiment, the carrier computing entity 100 may associate serviceable points with one another based the distances (e.g., GPS distance, map distance, actual traversed distance) between the serviceable points. Then, the carrier computing entity 100 may determine whether the distance between two serviceable points satisfies a configurable distance threshold (e.g., 0.2 miles). For the pairings satisfying a configurable distance threshold, the carrier computing entity 100 may determine whether the configurable travel time threshold for the pairings is satisfied. In one embodiment, the carrier computing entity 100 then associates serviceable points with one another based on the serviceable points satisfying the configurable distance threshold and the configurable travel time threshold. As will be recognized, additional thresholds associated with the information/data above may also be required for clustering/grouping. However, in other embodiments, only the configurable distance threshold or the configurable travel time threshold need be satisfied to associate serviceable points. As will be recognized, the configurable thresholds may be adjusted based on various information/data. For example, in response to determining that a driver had over a threshold number of deliveries (e.g., 19) and/or that the deliveries included packages over a threshold weight (e.g., 100 lbs.), the carrier computing entity 100 may adjust (e.g., relax or increase) the configurable travel time threshold.

In one embodiment, when two or more serviceable points are associated with each other, a cluster/group is formed. Each cluster/group has a parent serviceable point and one or more child serviceable points. The parent serviceable point may be the center or the top level of the cluster/group for the serviceable point. For each parent serviceable point, depending on the embodiment, child serviceable points in the cluster/group satisfy the corresponding thresholds—the configurable distance threshold, the configurable travel time threshold, combinations thereof, and/or the like. Serviceable points satisfying the corresponding thresholds are added as children to the cluster/group for the parent serviceable point. As will be recognized, a given serviceable point may be a child in one cluster/group and a parent in another. Similar, a single serviceable point may be a child of multiple clusters having different parent serviceable points. For example, in response to the carrier computing entity 100 determining that 125 Main Street satisfies the time and distance thresholds of both the 123 Main Street and 126 Main Street clusters (parents), 125 Main Street may be clustered as a child in each of the 123 Main Street and 126 Main Street cluster/group. Accordingly, information/data associated with 125 Main Street may be used for determining pick-up and/or delivery time windows for the 123 Main Street and 126 Main Street clusters. In some implementations, 126 Main Street serviceable point (child) and 123 Main Street serviceable point (child) may be clustered as children in the 125 Main Street cluster/group (parent). The process 600 for clustering/grouping serviceable points is described in more detail below.

The process 600 may begin with receiving information/data associated with a first serviceable point and a second serviceable point (602). For example, the information/data may specify a location of the first and of the second serviceable points. In some implementations, the information/data may specify addresses, geocodes, longitudes and latitudes, street segments, street nodes, geographic coordinates, and/or spatial reference information/data associated with the first and second serviceable points. Geocoding (sometimes called forward geocoding) uses a description of a location, most typically a serviceable point or a name, to find geographic coordinates from spatial reference information/data such as building polygons, land parcels, street addresses, postal codes (e.g. ZIP codes). Geocodes may be associated with different geographical locations having different population densities, traffic densities, accessibility, road or street quality, and/or the like. Information/data may be stored in association with different geocodes. In one implementations, information/data may be stored in association with specific geocodes associated with a location and/or a geofence surrounding the location. For example, information/data specifying population and traffic density for the city of "Chicago" may be stored in association with geocodes for the city of "Chicago" and/or geofences surrounding the city of "Chicago" or surrounding a portion of the city of "Chicago." In some implementations, a geographical location type is stored in association with geocodes. For example, in one implementation, the geographical locations types may be super-rural, rural, suburban, urban and super-urban. These geographical types specify different traffic and population densities. For example, the urban and super-urban geographical location types may be respectively associated with cities having dense and very dense traffic and population. Similarly, the rural and super-rural geographical location types may be associated with a light and a very light density of population and traffic. Finally, the suburban geographical location type may be associated with an average density of traffic and population. In some implementations, the type of geographical location may be more granular. For example, some embodiments may have more than 5 types (e.g., 11 types) of geographical locations each specifying a measure of population and traffic density. In other implementations, the geographical locations types may be less granular (e.g., 2 types).

The process 600 may continue with determining the geocodes and geographic location types with the corresponding serviceable points (604). In some implementations, the carrier computing entity 100 may determine a geocode for the first and a geocode the second serviceable points by simply accessing the received information/data. In some implementations, the carrier computing entity 100 may access a database to determine a geocode for the first and a geocode second serviceable points based on the first and second serviceable points.

The process 600 may continue with identifying, based on the determined geocodes, a geographic location type, a configurable distance threshold, and a configurable travel time threshold (608). For example, the carrier computing entity 100 may determine based on a geocode for the location including the first and second address, that the location is a "rural" location. Similarly, the carrier computing entity 100 may determine based on a geocode for the location including the first and second address, that the location is an "urban" location. The carrier computing entity may then access information/data specifying clustering/grouping thresholds. For example, the carrier computing entity 100 may access information/data shown in FIG. 7A.

The information/data may specify one or more thresholds for different areas based on geocodes. In some implementations, the thresholds include at least one threshold specifying a configurable distance threshold for clustering/grouping. In some implementations, the thresholds include at least one threshold specifying a configurable travel time threshold for clustering/grouping. The thresholds may include a configurable travel time threshold for each travel method. For example, one threshold may be for walking. A different threshold may be for driving.

With reference to FIG. 7A, the "exact" (primary) address clustering/grouping level depicts thresholds set to a level where the delivery address location is essential the serviceable point. The "vehicle stop" level depicts thresholds that are set for the situation where a delivery vehicle is parked and the driver is walking around to multiple proximate delivery serviceable points. Finally, the "Street Level" thresholds are for a delivery driver that may drive between serviceable points to make deliveries. For example, for a "vehicle stop" case at a "rural" area, the configurable travel time threshold may be 60 seconds, and the configurable distance threshold may be 400 meters. However, for a "vehicle stop" case at an "urban" area, the configurable travel time threshold may be 30 seconds, and the configurable distance threshold may be 50 meters. These thresholds may be customized for different types of geocodes and locations. FIG. 7A shows 4 different types of exemplary geographic location types. In some implementations, the type of serviceable points may be more granular. These thresholds may be customized to account for various population densities that impact vehicle stop distances and delivery times. For example, an apartment in Manhattan (super-urban type) will have different time and distance thresholds associated with its serviceable point cluster/group than a serviceable point for a farm in Nebraska (rural type). Similarly, the time and distance thresholds may be customized to account for the impact of the travel method associated with the delivery.

The process 600 may in response to determining that a distance and a travel time between the first and second serviceable points satisfy the configurable time and configurable distance thresholds cluster/group the first and second serviceable points into a cluster/group (610). For example, with reference to the "urban," "vehicle stop" example above, the carrier computing entity may determine that travel time, between the first and second serviceable points, is less than 30 seconds and that the travel distance is less than 50 meters. In response to such determination the carrier computing entity may cluster/group the first and second address. Once addresses are clustered, historical information/data for any address within the cluster/group may be used for estimating pick-up/delivery windows for any of the clustered addresses.

In some implementations, the process 600 may, optionally, continue with receiving information/data associated with a third serviceable point (612). The third address may be different from the first and second serviceable points. In response to determining that a distance and/or a travel time between the first and third serviceable points fail to satisfy the configurable time and configurable distance thresholds, the process 600 may, optionally, continue with not clustering/grouping the third serviceable point into the cluster/group (614). Similar to the above, the carrier computing entity 100 may determine whether the third address satisfies the respective time and distance thresholds. For example, with reference to the "urban," "vehicle stop" example above, the carrier computing entity may determine that travel time, between the first and third addresses, is more than 30 seconds and that the travel distance is more than 50 meters. In response to such determination the carrier computing entity may not cluster/group the third address into the cluster/group.

In some implementations, the process 600 may, optionally, receive information/data specifying a method of travel between the first and second serviceable points during deliveries, wherein identifying the second threshold is further based on the received information/data (616). As described above, the process 600 may receive information/data specifying a method of travel between the first and second serviceable points. In some implementations, the received information/data may be used to determine the configurable time and configurable distance thresholds. For example, as described with reference to step 608 and FIG. 7A, the received information/data may be used to determine a method of travel used by the delivery personnel and, in turn, identify a threshold based on the determined method of travel. In some implementations, the method of travel may be determined using a location-determining device used by the delivery personnel. In other implementations, the method of travel may be determined using a location-determining device positioned on a delivery vehicle used by the delivery personnel. A detailed example for the clustering/grouping of 123 Main St, 125 Main St, and 126 Main St follows.

Figures 8A, 8B:
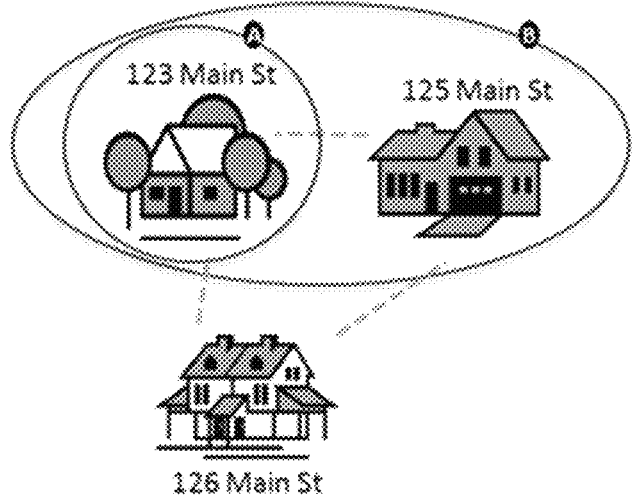

FIGS. 8A, 8B, 8C, 9A, and 9B shown a clustering/grouping example for addresses above. FIG. 8A shows thresholds determined based on a geocode for a location including 123 Main St, 125 Main St, and 126 Main St. As shown in FIG. 8A, different thresholds are determine for different travel methods. Based on the "exact" threshold different apartments at 123 Main Street may be clustered ((A) of FIG. 8B) since the distance between serviceable points for the apartments is 5 meters and the travel time is 10 seconds. These distance and travel time parameters are less than the configurable distance threshold values of 10 meters and the configurable travel time threshold values 20 seconds. Since a delivery to the serviceable point of 123 Main Street, apartment A, would be within a short distance and time from a delivery to 123 Main Street apartment B, lower distance thresholds are more suitable for this particular case.

To address serviceable points that are located close to one another, vehicle-stop clustering/grouping is an option to associate serviceable points. For example, both 123 Main Street and 125 Main Street may have deliveries completed within 27 meters and at 36 seconds of one another. Since the time and distance between serviceable points are less than the configurable distance threshold values of 40 meters and the configurable travel time threshold values 60 seconds, the two serviceable points may be clustered as shown (B) in FIG. 8B. However, 123 and 126 Main Street serviceable points and/or stops are 50 meters and 100 seconds apart. Based on the "vehicle stop" thresholds 126 is not eligible to be clustered with 123 Main St.

However, with reference to FIG. 8C 126 Main Street is eligible to be clustered with 123 Main Street based on the "Street Level" thresholds. For example, the 50 meters and 100 seconds of 126 Main Street satisfies or is less than the "Street Level" thresholds of 60 Meters and 100 s. Similarly, 124, 122 Main Street may also be clustered with 123 Main Street as shown in FIG. 8C. For simplicity, the following example is directed toward estimating a delivery window for a location cluster/group that includes only 123 and 125 Main Street.

FIGS. 9A and 9B respectively depict historical information/data for 123 and 125 Main Street, and estimated pick-up/delivery times for the same. As shown in FIG. 9B the averages for each weekday and for each route include historical information/data from both 123 Main Street and 125 Main Street. The estimated pick-up/delivery times of FIG. 9B may be used to generate estimated pick-up/delivery windows for either 123 Main Street or 125 Main Street. Similar to examples above, if no sufficient information/data is available for determining an estimate for a particular day or route, an estimate based on all historical information/data for both serviceable points may be used for the particular day or route. Once serviceable points are clustered, historical data for the cluster may be used to estimate delivery times, in a manner similar to the case described above with reference to a single serviceable point. The following section describes an example where historical data for a cluster is used to estimate a delivery window for a serviceable point in the cluster.

4. Exemplary Process for Determining Confidence Scores and for Estimating Pick-Up/Delivery Windows Based on the Same FIG. 10 shows process 1000 for estimating pick-up/delivery windows based on one or more confidence scores and determining whether the estimated pick-up/delivery windows are reliable. In some implementations, the process 1000 is an optional continuation of the process 400. In some implementations, the process 1000 is a standalone process. Turning back to the example of FIGS. 9A and 9B, process 1000 may be used to create pick-up/delivery windows for the cluster/group. The process 1000 begins with determining, for each estimated pick-up/delivery time, a confidence score specifying a likelihood that the estimated pick-up/delivery time is accurate (1002). In some implementations, the confidence score is determined based on a standard deviation for the estimated pick-up/delivery times for the serviceable point or the serviceable point cluster/group. For example, a confidence score may be calculated as shown in FIGS. 11A and 11B. FIG. 11A depicts historical delivery information/data for Thursdays to the 123 Main Street for a plurality of routes. The average delivery time for the Smiths on Thursday is 1:15 PM between all four routes. This would result in a 4-hour estimated delivery window of 11:15 AM-3:15 PM. The confidence factor provides an estimate of the level of certainty that a driver will deliver to the 123 Main Street location during that window. The confidence factor for the 11:15 AM-3:15 PM estimated delivery window above may be determined using the following steps, with reference to FIG. 11 (Military time is used for clarity):

1. The Thursday delivery times for all routes (above) are averaged:

(14.75+12.25+15.5+10.25/4=13.19)

2. Each delivery time is then subtracted from the average delivery time to determine the difference of each time from the average:

10$A$(14.75−13.19=1.56)

10$B$(12.25−13.19=−0.94)

10$C$(15.50−13.19=2.31)

10$D$(10.25−13.19=−2.94)

3. The difference between each time and the average are then squared and divided by the sample size to determine the variance:

$10A(1.56^2=2.44)$ $10B(-0.94^2=0.88)$ $10C(2.31^2=5.35)$ $10D(-2.94^2=8.63)$ $2.44+0.88+5.35+8.63=17.23$ $17.23/4(\text{number of deliveries})=5.77$ 4. The standard deviation (square root of the variance) is determined:

$\sqrt{5.77}=2.40$

5. The Standard Deviation is converted to a Z-value by dividing the Standard Deviation by half of the range or in this case, the span of the window (4 hours/2=2):

$2.4/2=\text{of }1.2$

6. The Z-value is converted to a confidence factor through referencing a Z-value table.

$Z$ value of 1.20=Confidence Factor of 76

The resulting confidence factor for this example is 76, which translates to 76% likelihood that the driver will complete the delivery within the 11:15 AM-3:15 PM estimated delivery window. With the confidence factor threshold of 70, the 123 Main Street location will receive the 11:15 AM-3:15 PM estimated delivery window for its delivery. In some implementations, the determined confidence score may be weighted or adjusted according to configurable scale.

The process 1000 may continue with determining, an estimated delivery window based on the confidence score, wherein the length of the estimated window is based on the confidence score (1004). In some implementations, confidence scores may be used to determine a customized size of a delivery window. For example, a confidence score of 100 indicates that a customer will receive his or her delivery at the exact estimated time. Therefore, a very small window may be suitable for an estimate having a confidence score of 100. On the other hand, a confidence score of 10 indicates that it is unlikely that a customer will receive his or her delivery at the exact estimated time. Accordingly, a large or very large window may be suitable for an estimate having a confidence score of 10. In some implementations, various thresholds may be used to determine the size of a window. FIGS. 12A-12D depict various customized window sizes (1 hr, 2 hr, 3 hr, 4 hr) estimating an estimated pick-up/delivery time.

To determine which estimated delivery window (12A-12D) will be provided, a sequential hierarchy may be established. The smallest window may be evaluated first. If the associated confidence factor is met, the window may be provided to the customer. If a window does not satisfy the threshold confidence factor, the next window may be evaluated. Confidence thresholds for the 3 hr, 2 hr, and 1 hr windows will progressively increase to ensure delivery performance is maintained at a high standard (e.g., 75 for 3 hr, 80 for 2 hr, 85 for 1 hr). These thresholds may be customized to achieve a desired accuracy. In some implementations, the confidence scores and the steps above may be performed by the carrier computing entity 100.

Step 1006 of process 1000, shown in phantom, is an optional step. In some implementations, in response to determining that a confidence score satisfies a configurable threshold, the process 1000 may continue with providing the estimated delivery window to a user device of a first user that is associated with the first serviceable point (1006). Similarly, in response to determining that a confidence score does not satisfy a configurable threshold, the process 1000 may, optionally, continue with not providing the estimated delivery window to a user device (1008). For example, a minimum confidence score threshold of 50 may be required to provide a customer with an estimated window. For example, a confidence score of 44 for a delivery estimate may result in the carrier computing entity 100 not providing an estimated delivery window to a respective customer.

Finally the process 1000 may end with, optionally, determining that the estimated delivery window is for a delivery during a specified/particular period, and in response, modifying the estimated delivery window (1010). The carrier computing entity 100 may graphically plot historical estimated delivery window effectiveness over time. According to the plot, the carrier computing entity 100 may determine days or date ranges during which deliveries are less likely to be made within the estimated pick-up/delivery windows. For example, certain holidays may experience a high volume of traffic. In turn, the volume of traffic may contribute to delays during deliveries. Such delays may propagate and result in deliveries falling outside the estimated pick-up/delivery windows.

In order to improve the accuracy of estimated pick-up/delivery windows provided to customers, the carrier computing entity 100 may isolate delivery periods that experience less accurate delivery window performances. In some implementations, these periods may be evaluated for pick-up/delivery windows separately. For example, historical information/data from such periods may be used for determining an estimated delivery window. In some implementations, historical information/data from periods outside the fluctuation periods may be filtered or not used for estimating pick-up/delivery windows during the fluctuation periods. In some implementations, the confidence score thresholds for the pick-up/delivery windows may be altered to accommodate the fluctuation periods. For example, the thresholds may be raised to ensure that deliveries are made within the pick-up/delivery windows. Isolating periods of seasonality may help improve the accuracy of estimated pick-up/delivery windows during peak periods and/or other days or dates where there have been fluctuations in delivery window performance. In some implementations, periods of fluctuation may be determined for different serviceable points. For example, during a particular period, the state of Georgia may experience a high level of fluctuation while the state of Florida is experiencing low level of fluctuation. In some implementations, different periods of fluctuation are determined for different serviceable points. Estimated delivery window calculations may be based on historical delivery information/data for the identified dates of fluctuation. Calculations may be adjusted by setting different confidence score thresholds for each date range.

Once an item enters the network, the carrier computing entity 100 determines if there have been any changes to the scheduled delivery date. If there is a change, the carrier computing entity 100 updates the estimated delivery window according to the following. During transit, the carrier computing entity 100 system receives updates on the status of items. The carrier computing entity 100 determines status changes for items based on the received information/data. For example, the carrier computing entity 100 may compare an existing scheduled delivery date to a revised scheduled delivery date. If the revised scheduled delivery date is different, the carrier computing entity 100 may retrieve a new estimated delivery window and update the delivery date and the estimated delivery window for the item accordingly. The revised estimates may be saved at a local store of the carrier. Additionally the revised estimates may be sent to customers or posted on a system of the carrier for tracking items.

Prior to the delivery date, for example, two days before the delivery date, route information/data for item delivery may become available and/or know. The carrier computing entity may access that above route information/data for a particular item and use the route information/data to provide a more accurate customized estimated delivery window. For example, the carrier computing entity may identify a route of delivery for a particular item delivery. The historical information/data associated with the particular route may be used to determine a more accurate estimate for the delivery. The estimate may then be used to determine a more accurate delivery window as described above. In some implementations, the customized estimated pick-up/delivery windows are updated only if the updated delivery window differs from the original delivery window by more than a configurable threshold. The updated estimates may be saved at a local store of the carrier. Additionally the updated estimates may be sent to customers or posted on a system of the carrier for tracking items.

In some implementations, if the route of delivery changes the carrier computing entity updates the associated delivery window. In some implementations, live GPS information/data associated with the delivery vehicle and/or personnel may be used to update the customized estimated delivery window. In some implementations, the customized estimated pick-up/delivery windows are updated only if the updated customized estimated delivery window differs from the original customized estimated delivery window by more than a configurable threshold. The updated estimates may be saved at a local store of the carrier. Additionally the updated estimates may be sent to customers or posted on a system of the carrier for tracking items.

In some implementations, historical information/data for serviceable points are updated periodically. In some implementations, clusters of serviceable points are updated periodically. For example, historical information/data may be updated weekly and/or bi-weekly. In some implementations, estimated pick-up/delivery windows are predetermined in response to the historical information/data being updated and/or the cluster/group of serviceable points being updated. In some implementations, periods of fluctuation are updated periodically. For example, periods of fluctuation may be updated yearly.

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation

The invention claimed is:

1. A computer implemented method comprising:
   collecting serviceable point data comprising a street address for each of a plurality of serviceable points;
   determining, based on signals generated by a delivery vehicle's telemetry system, that the delivery vehicle has stopped for longer than a predetermined period of time;
   responsive to the determination that the delivery vehicle has stopped for longer than the predetermined period of time, collecting geolocation data from a GPS sensor associated with the delivery vehicle;
   generating a first service route that represents a predicted path of the delivery vehicle, the predicted path beginning with a location indicated by the geolocation data and sequentially connecting the street address of each of the plurality of serviceable points;
   generating a first cluster of serviceable points from the first service route, the first cluster of serviceable points comprising a first serviceable point and a second serviceable point determined to be within a predetermined threshold of each other along the predicted path of the first service route;
   receiving first historical data for the first serviceable point, the first historical data comprising a plurality of dates and times of deliveries that occurred at the first serviceable point, wherein the dates and times of the deliveries are associated with at least a second service route comprising a second ordered plurality of serviceable points that included the first serviceable point;
   responsive to a determination that the first historical data is insufficient to predict an estimated delivery time for the first serviceable point via the first service route, accessing a second historical data for the second serviceable point, the second historical data comprising a plurality of dates and times of deliveries that occurred at the second serviceable point, wherein the deliveries are associated with at least a third service route comprising a third ordered plurality of serviceable points;
   generating the estimated delivery time for the first serviceable point of the first service route based at least in part on the first historical data and the second historical data; and
   automatically communicating the generated estimated delivery time to a remote computing device associated with the first serviceable point.

2. The computer implemented method of claim 1, wherein the predetermined threshold comprise a configurable distance threshold and a configurable travel time threshold.

3. The computer implemented method of claim 1, further comprising determining a confidence score for the estimated delivery time for the first serviceable point, the confidence score indicating a likelihood that the estimated delivery time is accurate.

4. The computer implemented method of claim 3 further comprising determining an estimated delivery window for the first serviceable point based at least in part on the estimated delivery time and the confidence score, wherein a length of the estimated delivery window is based on the confidence score.

5. The computer implemented method of claim 4, wherein the length of the estimated delivery window is inversely proportional to the confidence score.

6. A system, comprising:
   a data processing apparatus; and
   a computer memory apparatus in data communication with the data processing apparatus and storing instructions executable by the data processing apparatus and that upon such execution cause the data processing apparatus to perform operations comprising:

collecting serviceable point data comprising a street address for each of a plurality of serviceable points;

determining, based on signals generated by a delivery vehicle's telemetry system, that the delivery vehicle has stopped for longer than a predetermined period of time;

responsive to the determination that the delivery vehicle has stopped for longer than the predetermined period of time, collecting geolocation data from a GPS sensor associated with the delivery vehicle;

generating a first service route that represents a predicted path of the delivery vehicle, the predicted path beginning with a location indicated by the geolocation data and sequentially connecting the street address of each of the plurality of serviceable points;

generating a first cluster of serviceable points from the first service route, the first cluster of serviceable points being comprised of a first serviceable point and a second serviceable point determined to be within a predetermined threshold of each other along the predicted path of the first service route;

receiving first historical data for the first serviceable point, the first historical data comprising a plurality of dates and times of deliveries that occurred at the first serviceable point, wherein the deliveries are associated with at least a second service route comprising a second ordered plurality of serviceable points;

responsive to a determination that the first historical data is insufficient to predict an estimated delivery time for the first serviceable point via the first service route, accessing a second historical data for the second serviceable point, the second historical data comprising a plurality of dates and times of deliveries that occurred at the second serviceable point, wherein the deliveries are associated with at least a third service route comprising a third ordered plurality of serviceable points;

generating the estimated delivery time for the first serviceable point of the first service route based at least in part on the first historical data and the second historical data; and automatically communicating the generated estimated delivery time to a remote computing device associated with the first serviceable point.

7. The system of claim 6, wherein the predetermined threshold comprise a configurable distance threshold and a configurable travel time threshold.

8. The system of claim 6, wherein the operations further comprise determining a confidence score for the estimated delivery time for the first serviceable point, the confidence score indicating a likelihood that the estimated delivery time is accurate.

9. The system of claim 8, wherein the operations further comprise determining an estimated delivery window for the first serviceable point based at least in part on the estimated delivery time and the confidence score, wherein a length of the estimated delivery window is based on the confidence score.

10. The system of claim 9, wherein the length of the estimated delivery window is inversely proportional to the confidence score.

11. A computer program product comprising at least one non-transitory computer-readable storage medium having computer-readable program code portions stored therein, the computer-readable program code portions comprising:

collecting serviceable point data comprising a street address for each of a plurality of serviceable points;

determining, based on signals generated by a delivery vehicle's telemetry system, that the delivery vehicle has stopped for longer than a predetermined period of time;

responsive to the determination that the delivery vehicle has stopped for longer than the predetermined period of time, collecting geolocation data from a GPS sensor associated with the delivery vehicle;

generating a first service route that represents a predicted path of the delivery vehicle, the predicted path beginning with a location indicated by the geolocation data and sequentially connecting the street address of each of the plurality of serviceable points;

generating a first cluster of serviceable points from the first service route, the first cluster of serviceable points being comprised of a first serviceable point and a second serviceable point determined to be within a predetermined threshold of each other along the predicted path of the first service route;

collecting a first historical data for the first serviceable point, the first historical data comprising a plurality of dates and times of deliveries that occurred at the first serviceable point, wherein the dates and times of the deliveries are associated with at least a second service route comprising a second ordered plurality of serviceable points;

collecting a second historical data for the second serviceable point, the second historical data comprising a plurality of dates and times of deliveries that occurred at the second serviceable point, wherein the deliveries are associated with at least a third service route comprising a third ordered plurality of serviceable points;

generating an estimated delivery time for the first serviceable point of the first service route based at least in part on the first historical data and the second historical data; and automatically communicating the generated estimated delivery time to a remote computing device associated with the first serviceable point.

12. The computer program product of claim 11, wherein the predetermined threshold comprise a configurable distance threshold and a configurable travel time threshold.

13. The computer program product of claim 12, wherein the code further comprise determining a confidence score for the estimated delivery time for the first serviceable point, the confidence score indicating a likelihood that the estimated delivery time is accurate.

14. The computer program product of claim 13, wherein the code further comprise determining an estimated delivery window for the first serviceable point based at least in part on the estimated delivery time and the confidence score, wherein a length of the estimated delivery window is based on the confidence score.

15. The computer program product of claim 14, wherein the length of the estimated delivery window is inversely proportional to the confidence score.

\* \* \* \* \*

UNITED STATES PATENT AND TRADEMARK OFFICE
CERTIFICATE OF CORRECTION

PATENT NO. : 11,004,031 B2
APPLICATION NO. : 15/347881
DATED : May 11, 2021
INVENTOR(S) : Sumeet Pradeep Shroff et al.

It is certified that error appears in the above-identified patent and that said Letters Patent is hereby corrected as shown below:

In the Drawings

In sheet 6 of 12, FIG. 6, reference numeral 614, Line 3, after "fails" insert -- to --.

In the Specification

In Column 17, Line 25, delete "Route10A." and insert -- Route 10A. --, therefor.

In Column 19, Line 39, delete "an" and insert -- and --, therefor.

In Column 21, Line 12, delete "S1, S 2, S 3)," and insert -- S1, S2, S3), --, therefor.

In Column 21, Line 13, delete ""RTB," and insert -- "RTB," --, therefor.

In the Claims

In Column 29, Line 63, delete "limitation" and insert -- limitation. --, therefor.

Signed and Sealed this
Third Day of August, 2021

Drew Hirshfeld
*Performing the Functions and Duties of the
Under Secretary of Commerce for Intellectual Property and
Director of the United States Patent and Trademark Office*